US012578602B2

(12) United States Patent
Kim et al.

(10) Patent No.: US 12,578,602 B2
(45) Date of Patent: Mar. 17, 2026

(54) DISPLAY DEVICE

(71) Applicant: LG ELECTRONICS INC., Seoul (KR)

(72) Inventors: Hyeongryeol Kim, Seoul (KR); Changsoo Jin, Seoul (KR); Jaebong Kim, Seoul (KR); Kyeonghui Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/993,478

(22) PCT Filed: Jul. 12, 2022

(86) PCT No.: PCT/KR2022/010123
§ 371 (c)(1),
(2) Date: Jan. 10, 2025

(87) PCT Pub. No.: WO2024/014569
PCT Pub. Date: Jan. 18, 2024

(65) Prior Publication Data
US 2026/0010037 A1     Jan. 8, 2026

(51) Int. Cl.
*G02F 1/1335*     (2006.01)
*G02F 1/13357*     (2006.01)

(52) U.S. Cl.
CPC .. *G02F 1/133612* (2021.01); *G02F 1/133608* (2013.01); *G02F 2201/46* (2013.01)

(58) Field of Classification Search
CPC ........... G02F 2201/46; G02F 1/133612; G02F 1/133603
See application file for complete search history.

(56) References Cited

U.S. PATENT DOCUMENTS

2009/0128732 A1*     5/2009     Hamada ............... G02B 6/0068
349/58
2011/0141403 A1     6/2011     Kishimoto et al.
(Continued)

FOREIGN PATENT DOCUMENTS

EP          1833101 A2 *     9/2007     ........... G02F 1/1335
JP          08-236878          9/1996
(Continued)

OTHER PUBLICATIONS

PCT International Application No. PCT/KR2022/010123, International Search Report dated Apr. 3, 2023, 4 pages.
(Continued)

*Primary Examiner* — Erin Kryukova
(74) *Attorney, Agent, or Firm* — LEE, HONG, DEGERMAN, KANG & WAIMEY

(57)          ABSTRACT

A display device is disclosed. The display device of the present disclosure may include: a display panel; a frame located behind the display panel; a substrate located between the display panel and the frame and coupled to the frame; a light source mounted to the substrate and providing light to the display panel; a fastening member passing through the substrate, coupled to the frame, and pressing the substrate toward the frame; and a pad located between the substrate and the frame, contacting with the rear surface of the substrate and the front surface of the frame, and through which the fastening member passes.

15 Claims, 28 Drawing Sheets

(56) References Cited

U.S. PATENT DOCUMENTS

| | | | | |
|---|---|---|---|---|
| 2012/0236231 A1* | 9/2012 | Choi | .................... | G02B 6/0031 |
| | | | | 362/382 |
| 2014/0152940 A1* | 6/2014 | Wang | ................... | G02B 6/0011 |
| | | | | 349/62 |
| 2015/0331178 A1* | 11/2015 | Choi | .................... | G02B 6/0083 |
| | | | | 362/634 |
| 2020/0201384 A1* | 6/2020 | Kim | .................... | G02B 6/0078 |

FOREIGN PATENT DOCUMENTS

| | | | |
|---|---|---|---|
| JP | 2010186748 A | * | 8/2010 |
| JP | 2013-254565 | | 12/2013 |
| KR | 100731457 | | 6/2007 |
| KR | 101352104 | | 1/2014 |
| KR | 10-1836484 | | 3/2018 |
| KR | 1020220017322 | | 2/2022 |
| KR | 10-2022-0031040 | | 3/2022 |

OTHER PUBLICATIONS

European Patent Office Application Serial No. 22951224.9, Search Report dated Jul. 30, 2025, 10 pages.
Korean Intellectual Property Office Application No. 10-2025-7004183, Office Action dated Nov. 25, 2025, 6 pages.

* cited by examiner

[FIG. 1]
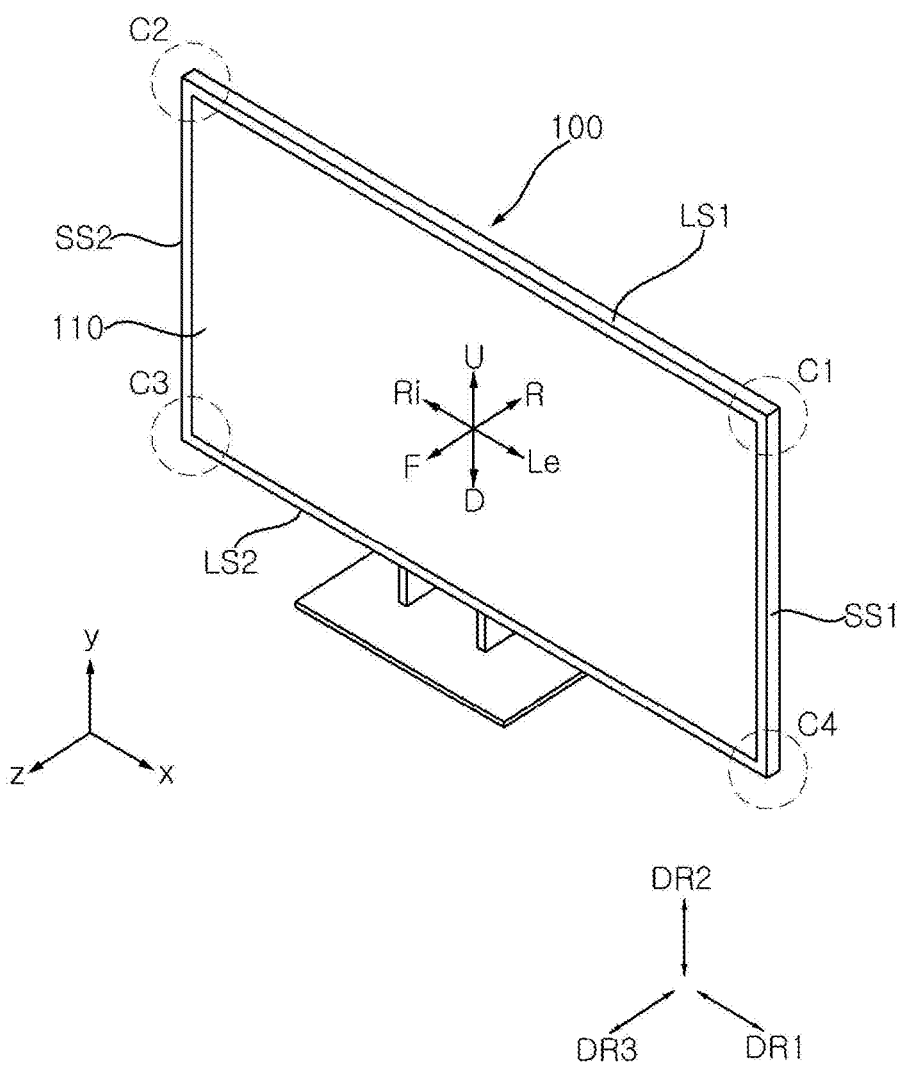

[FIG. 2]
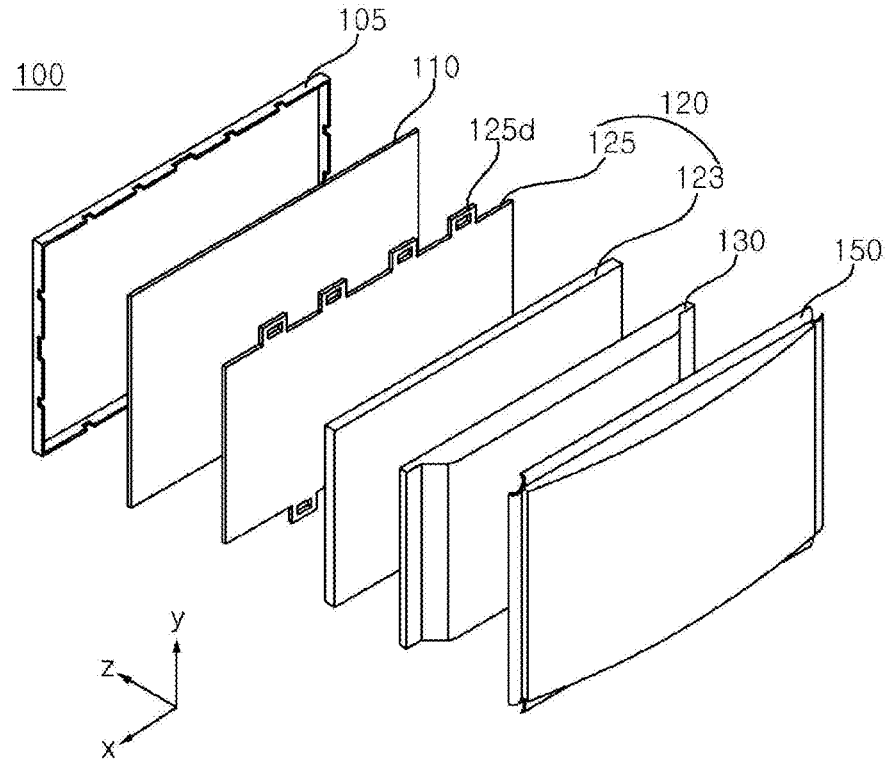

[FIG. 3]
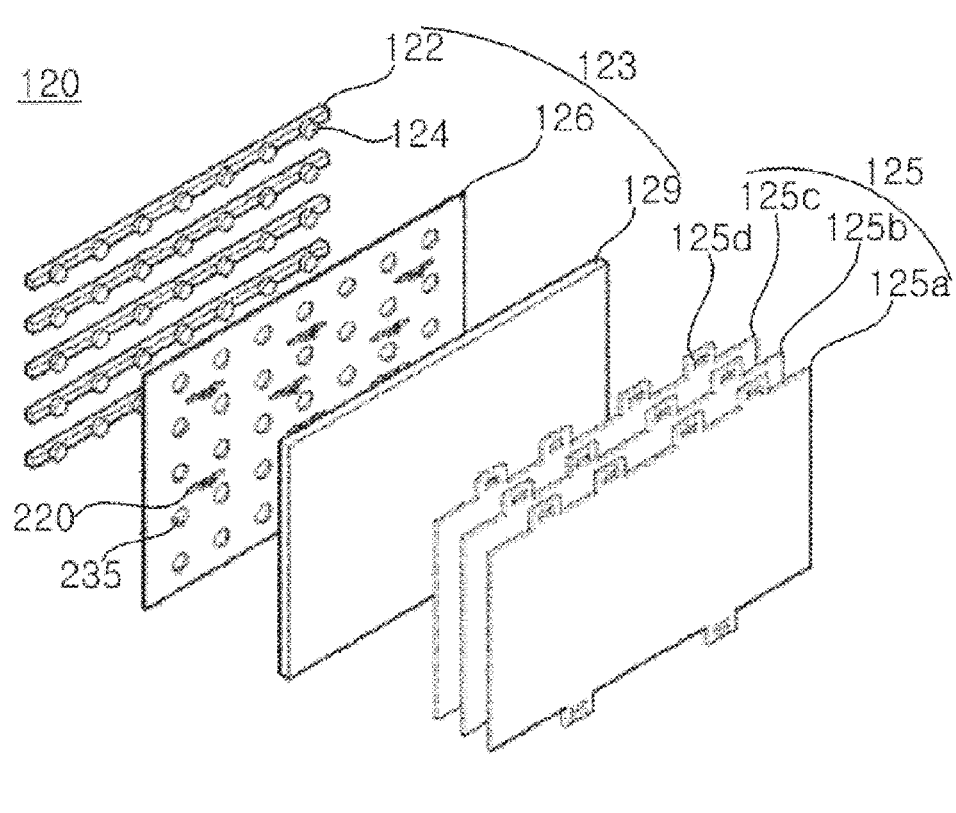
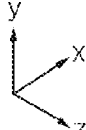

[FIG. 4]
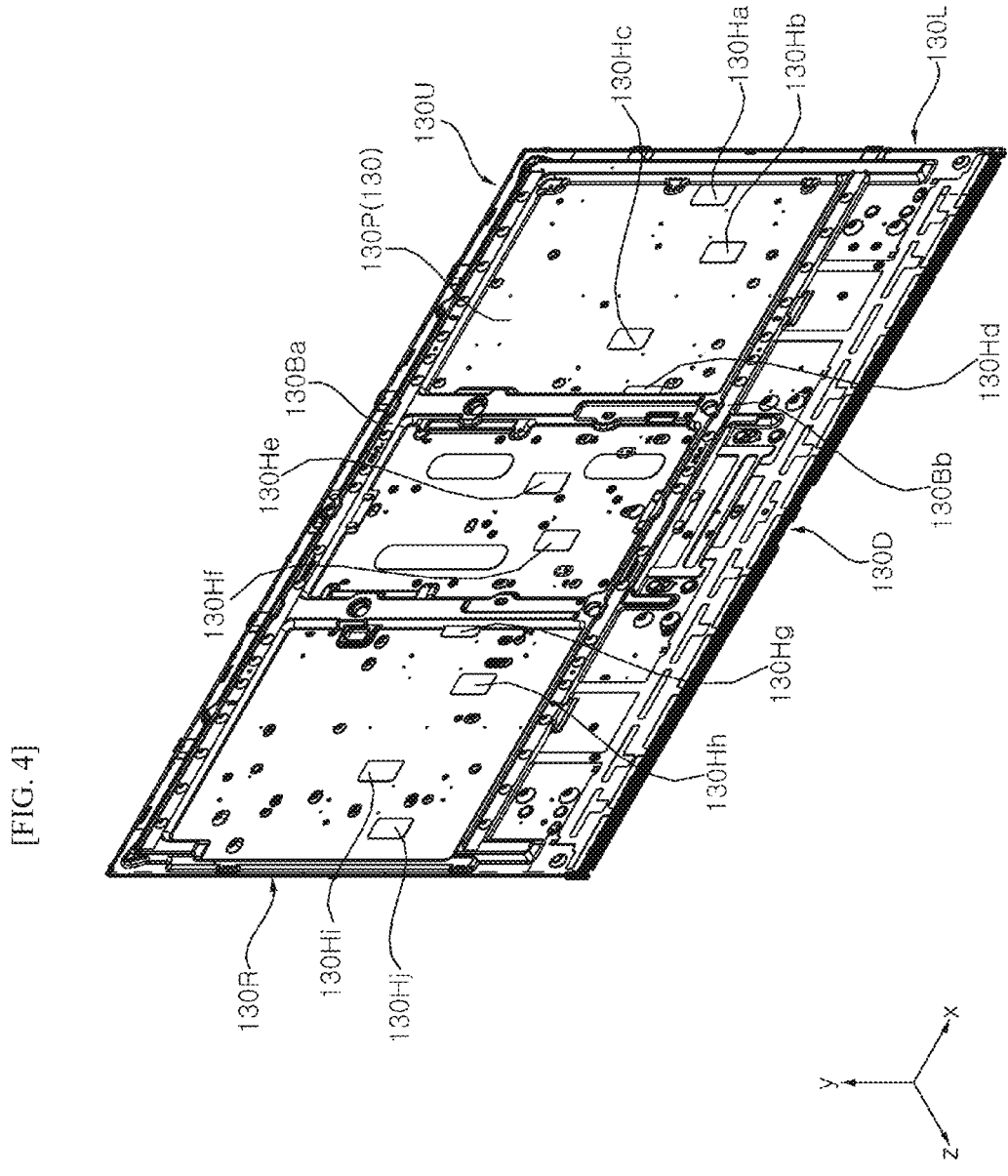

[FIG. 5]
222
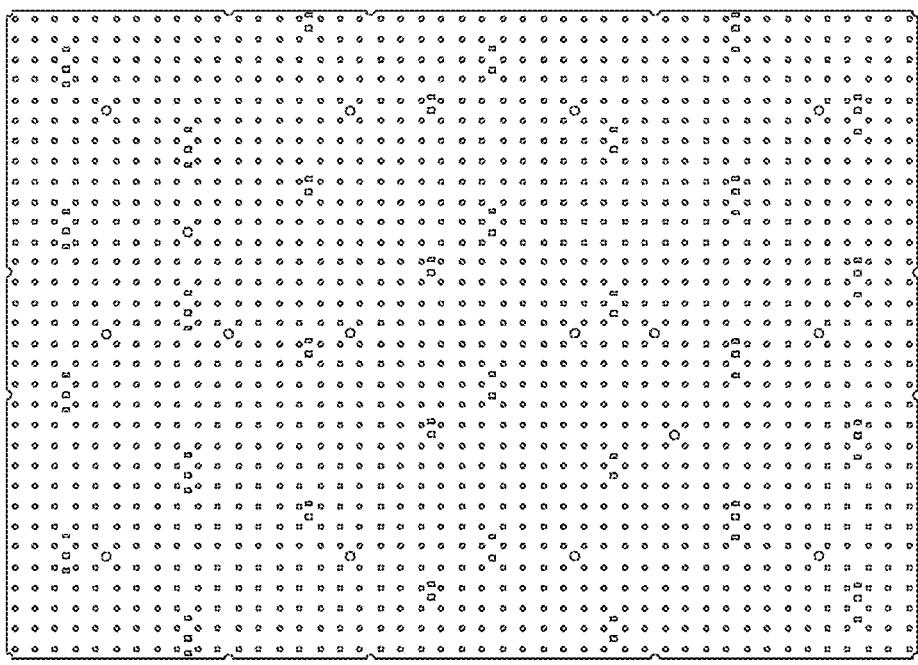

[FIG. 6]
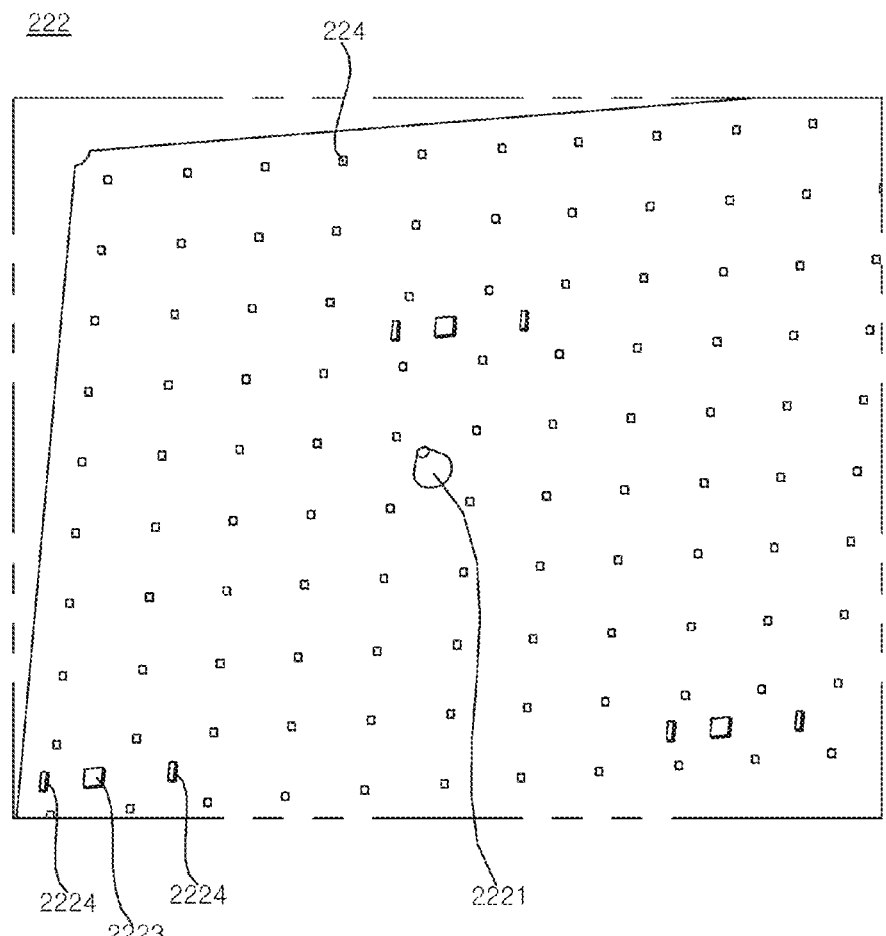

[FIG. 7]
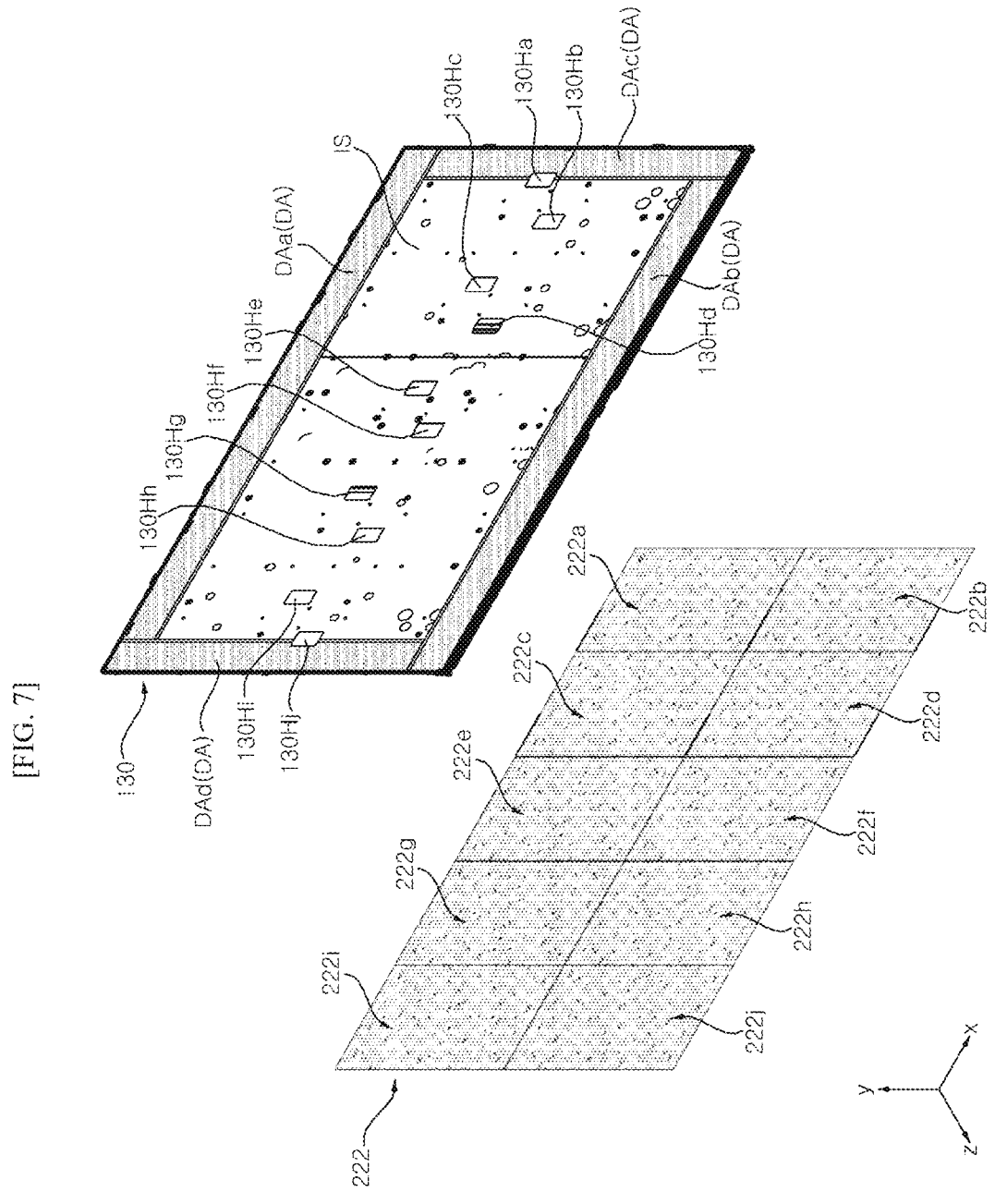

[FIG. 8]
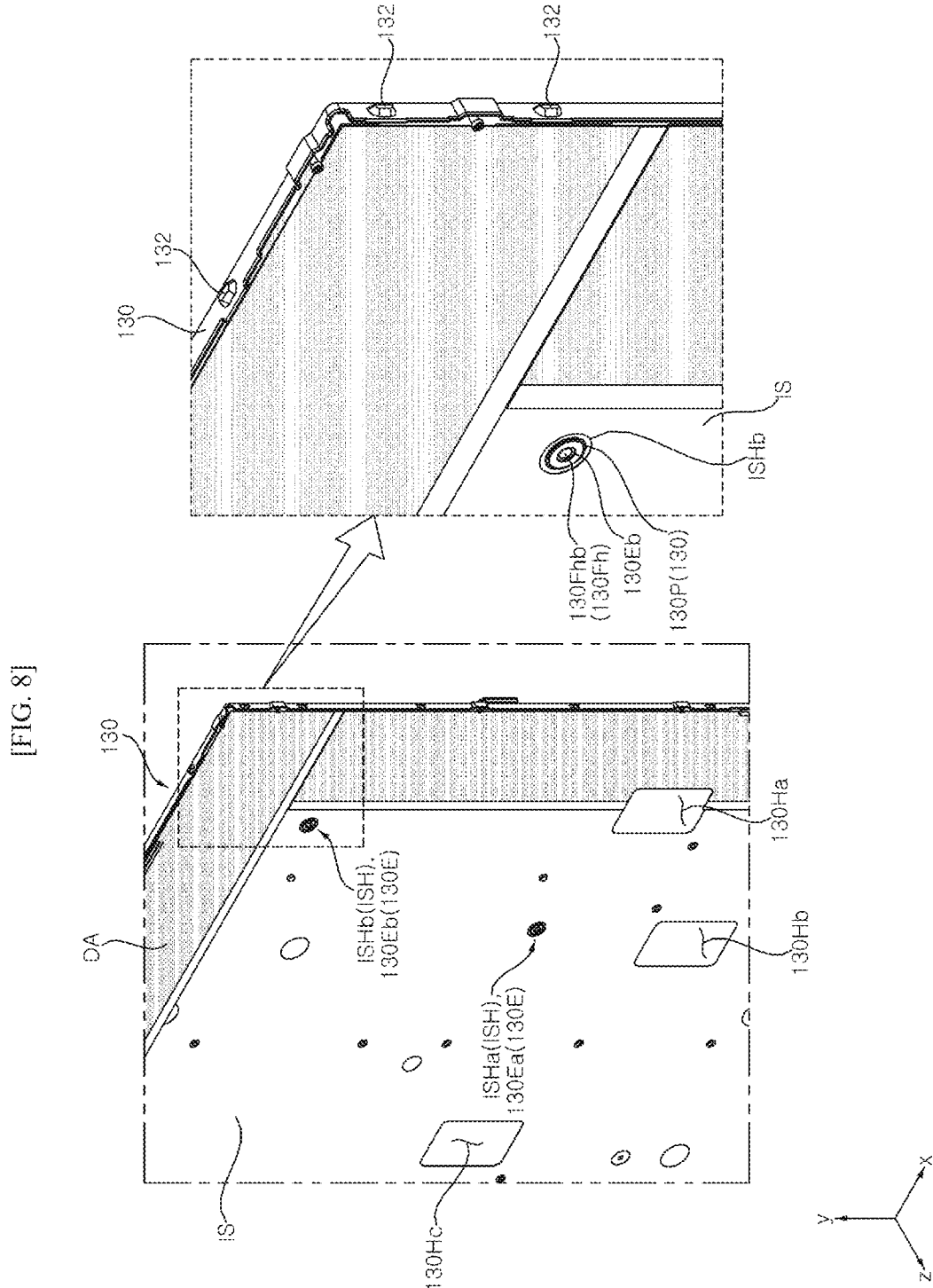

[FIG. 9]
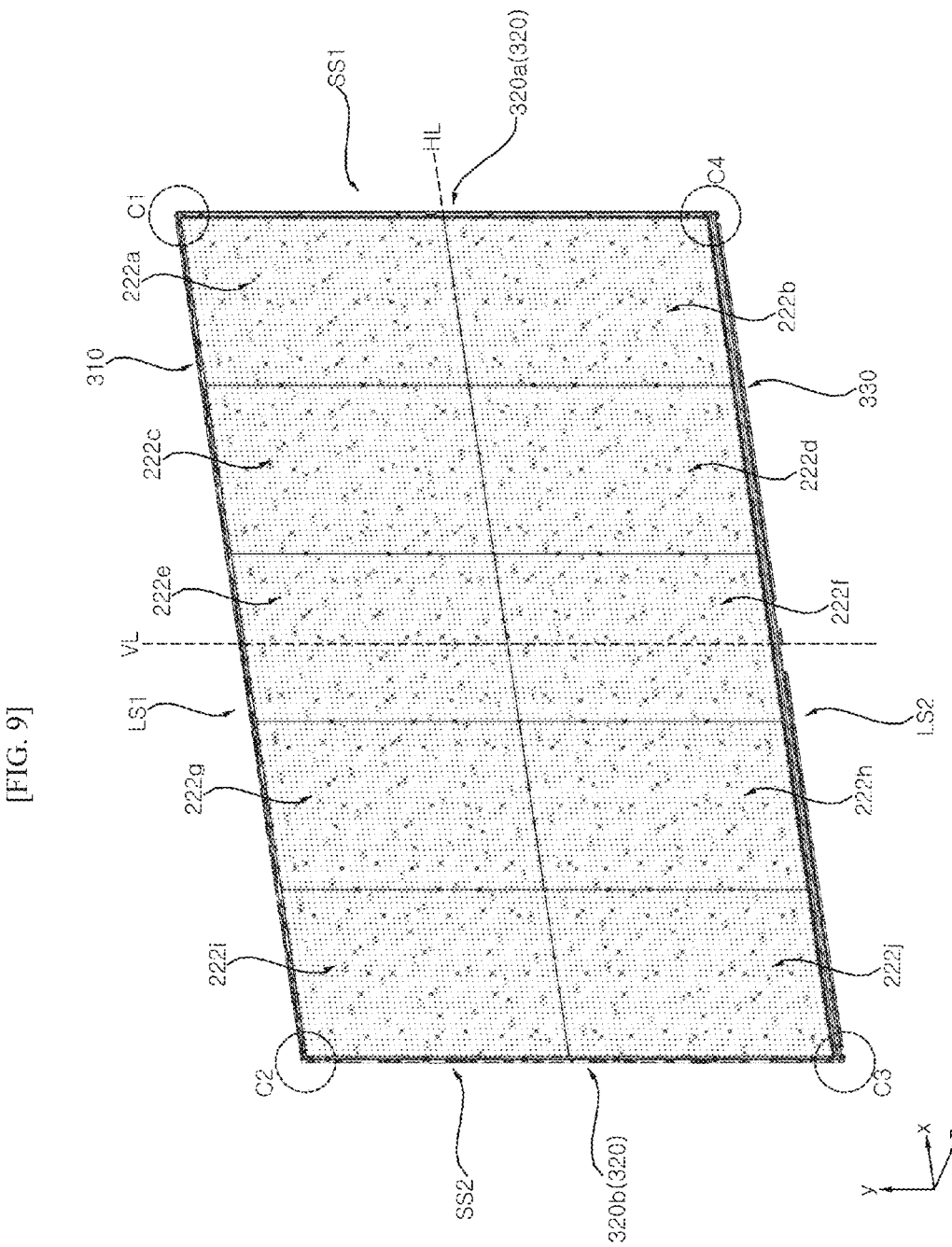

[FIG. 10]
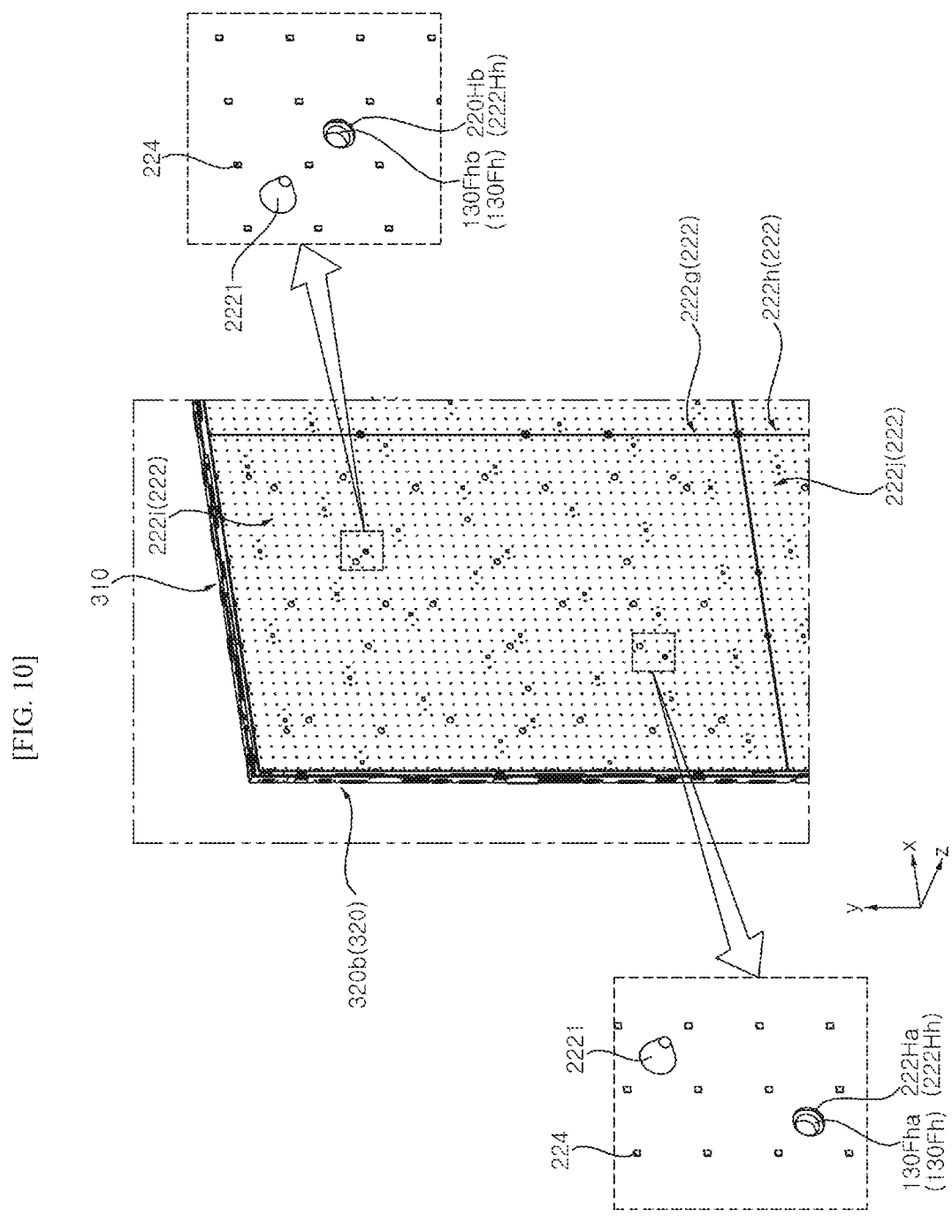

[FIG. 11]
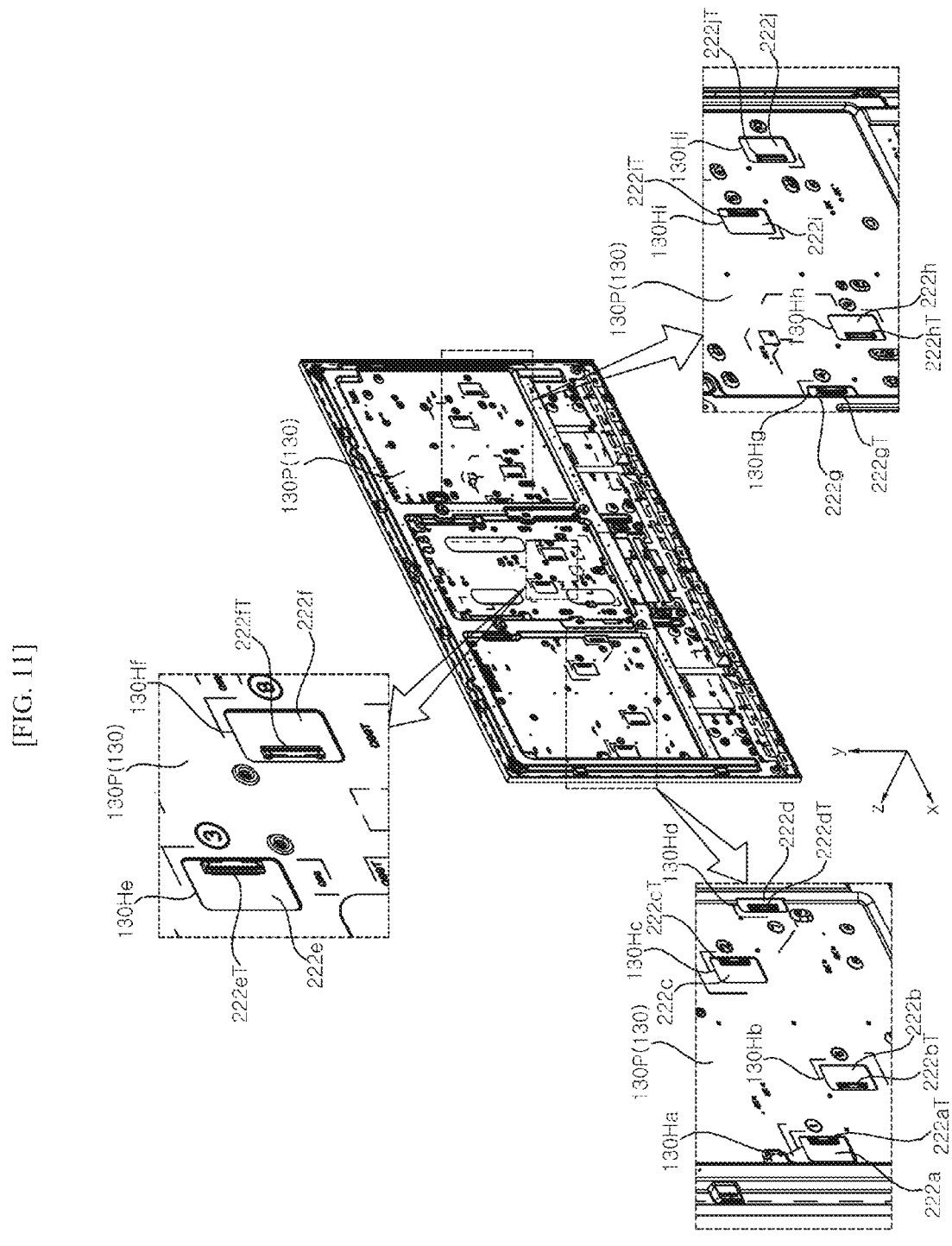

[FIG. 12]
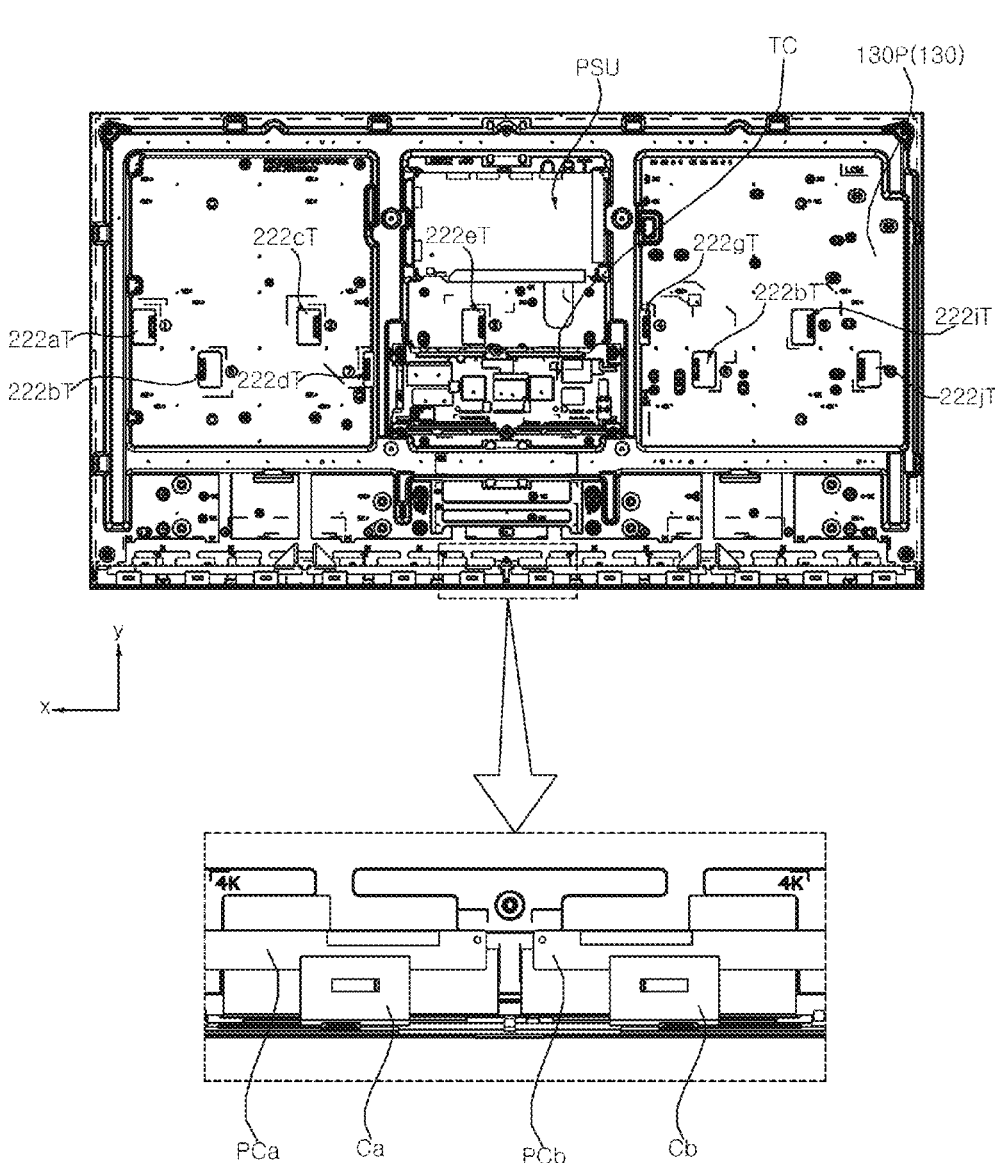

[FIG. 13]
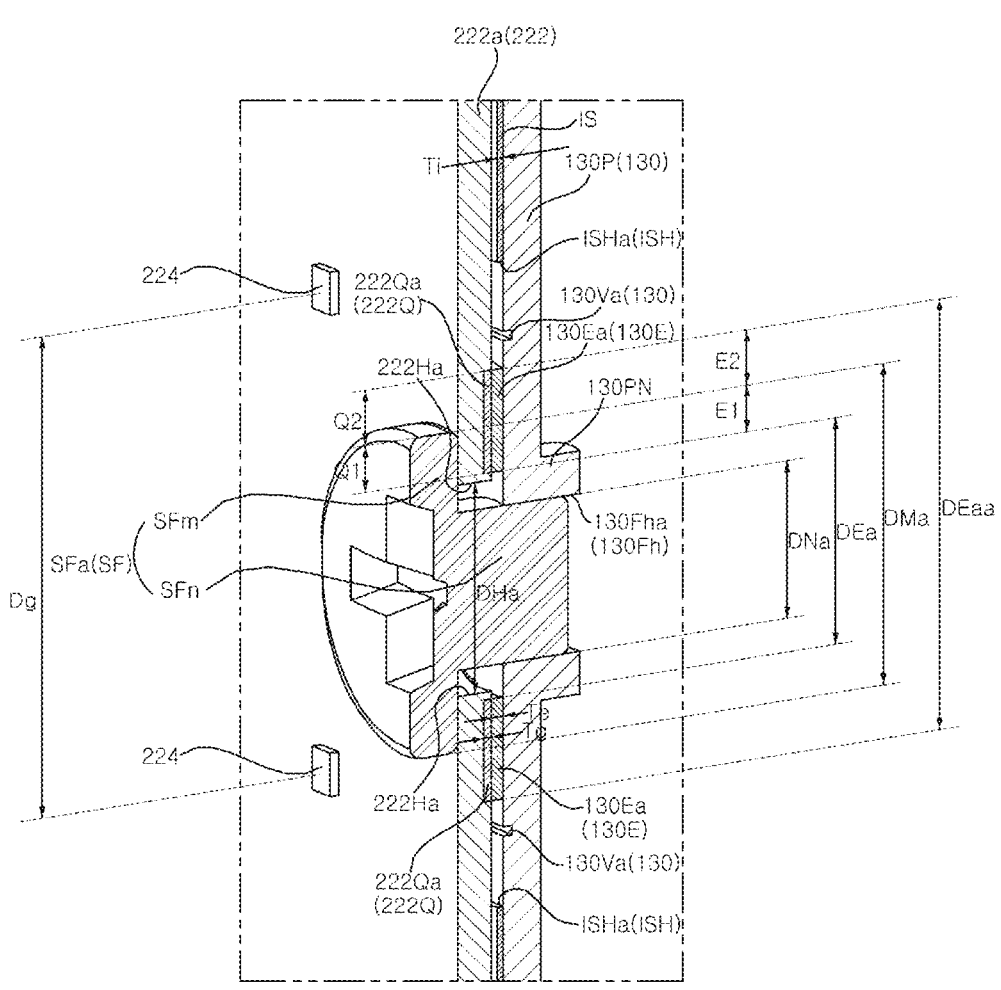
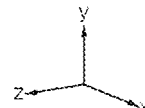

[FIG. 14]
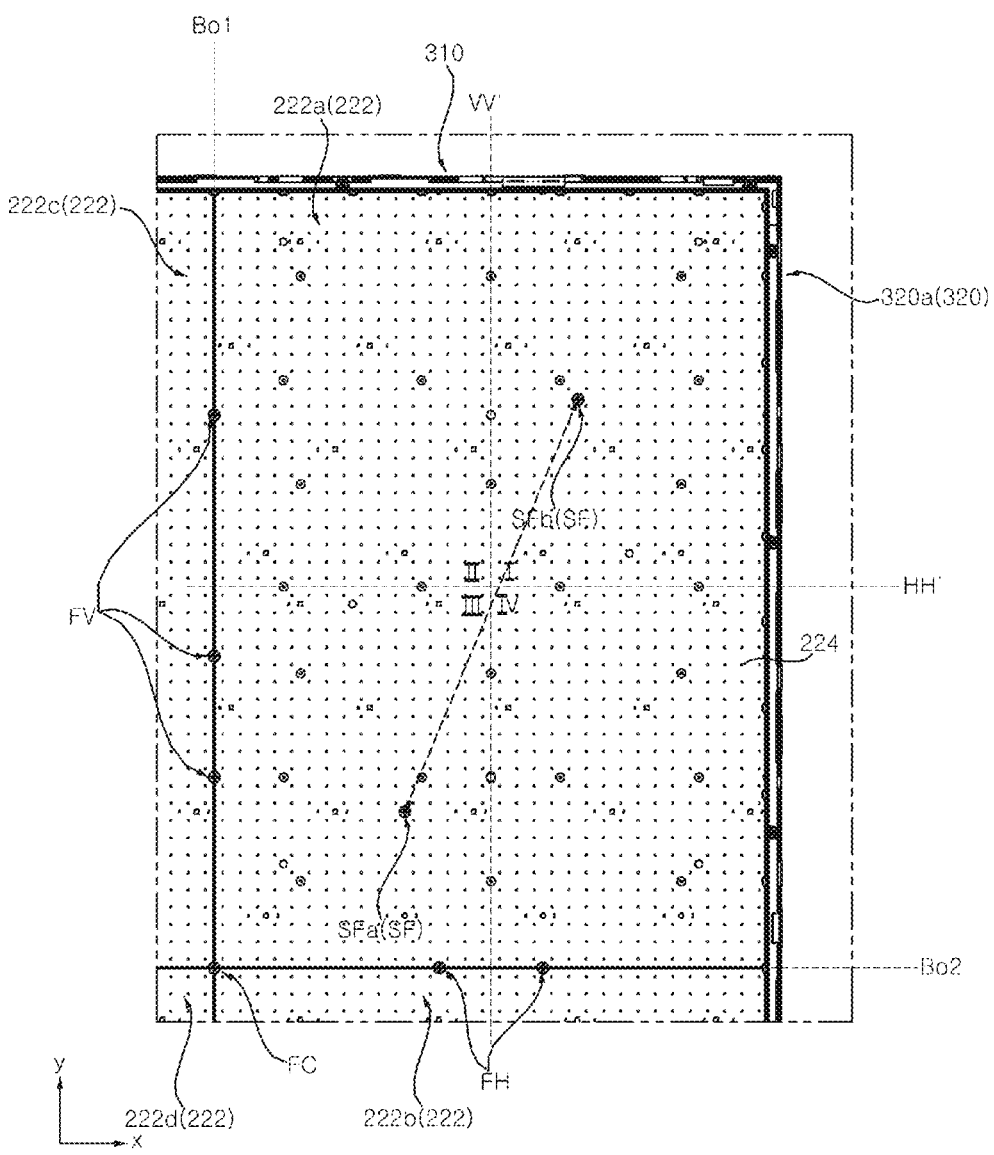

[FIG. 15]
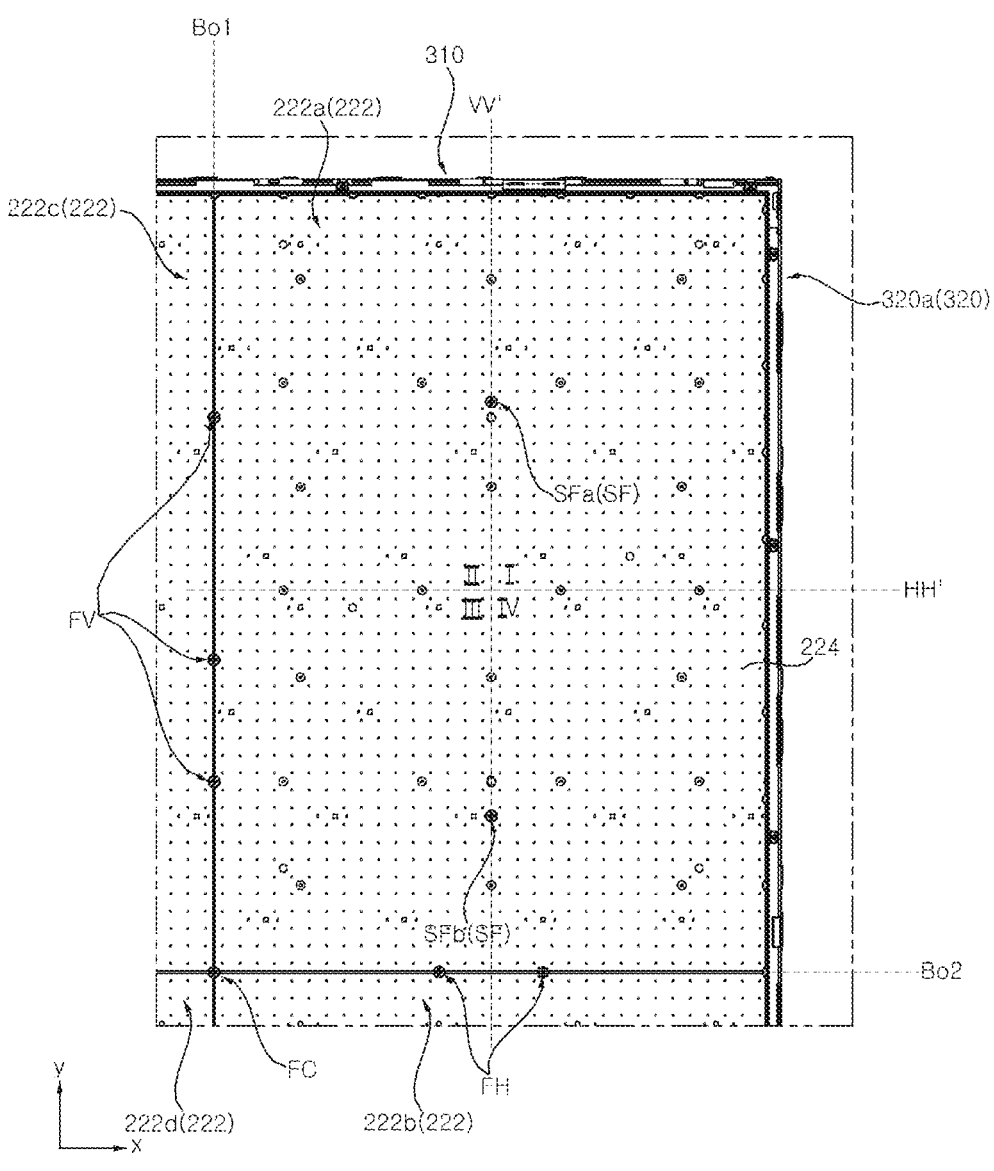

[FIG. 16]
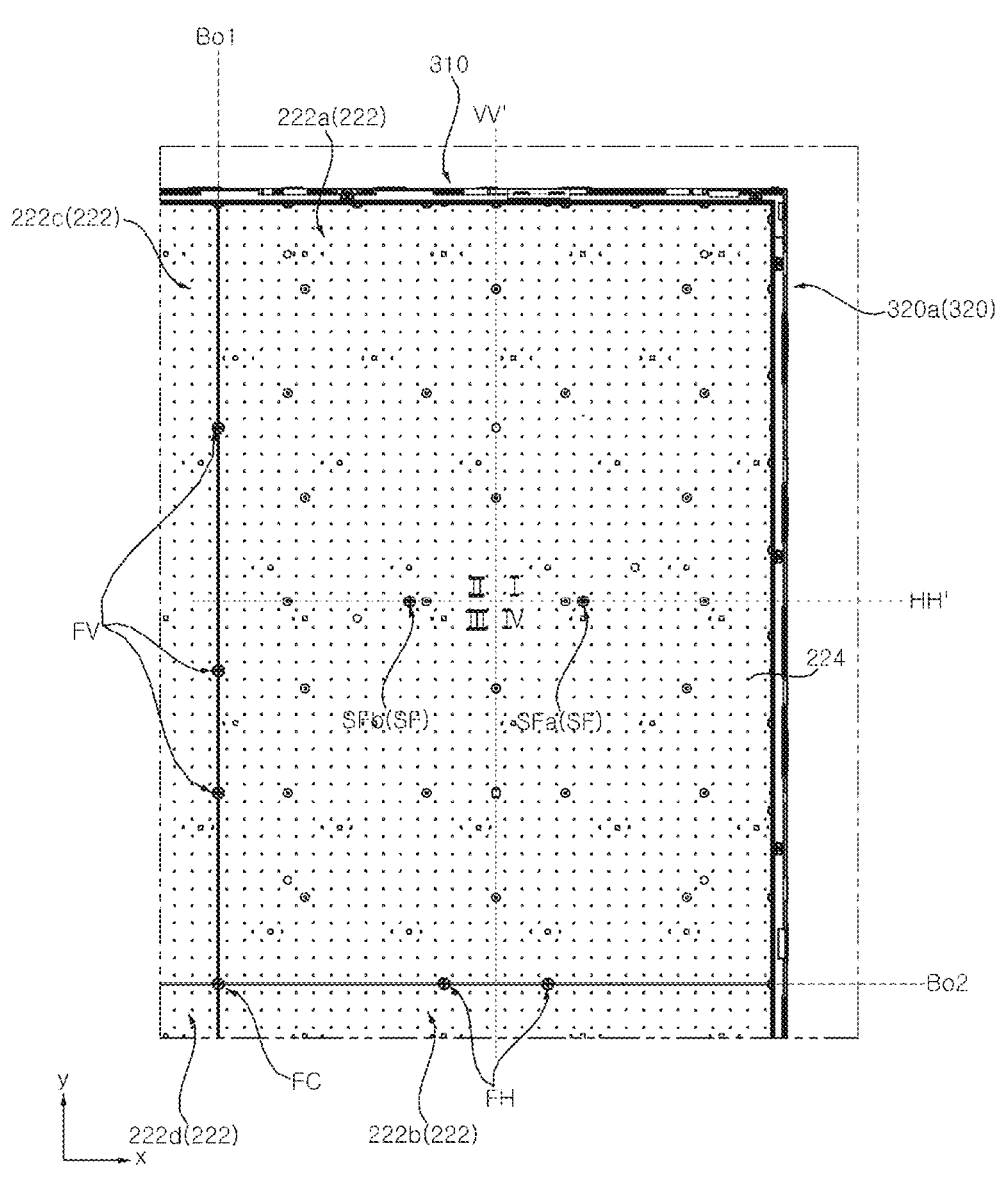

[FIG. 17]
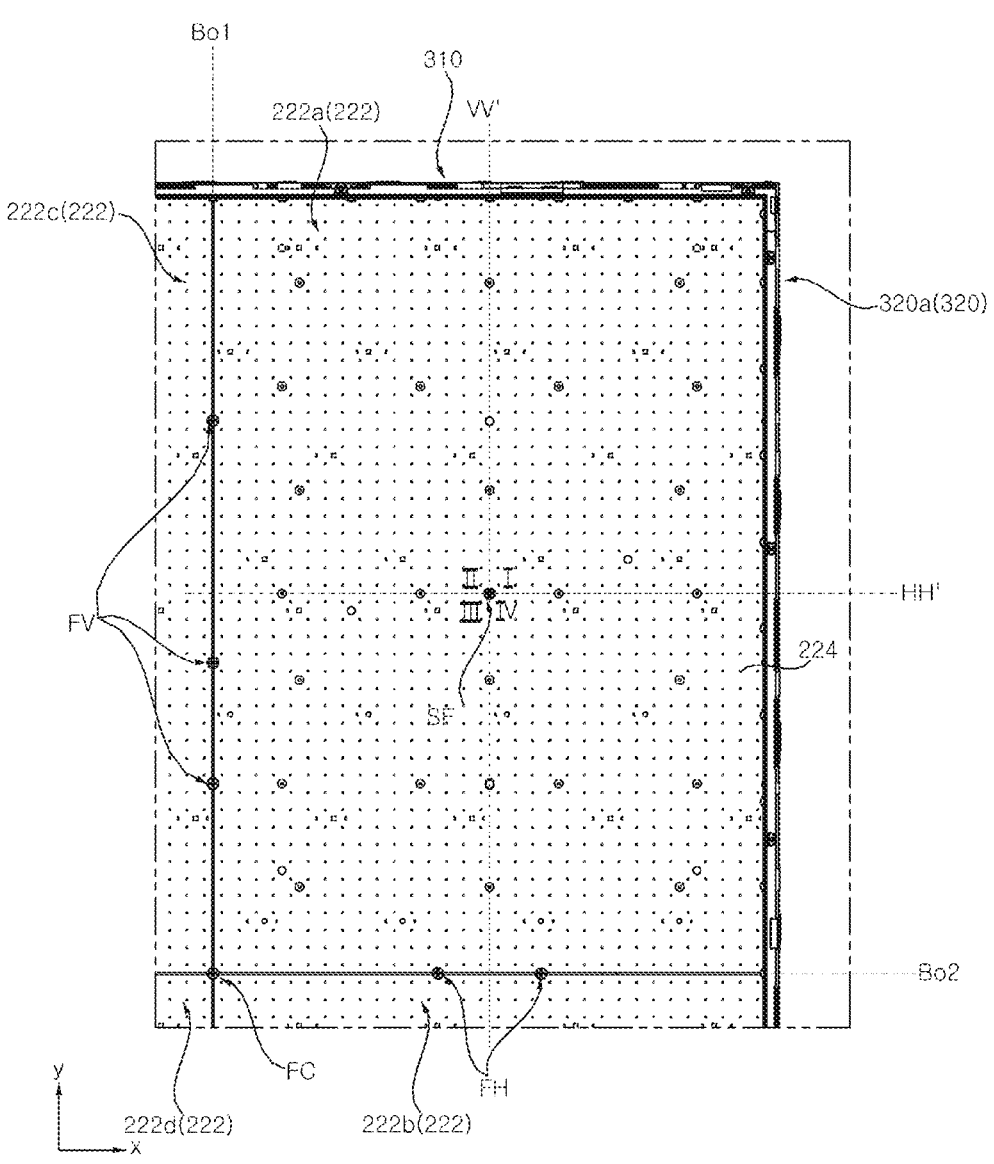

[FIG. 18]
226
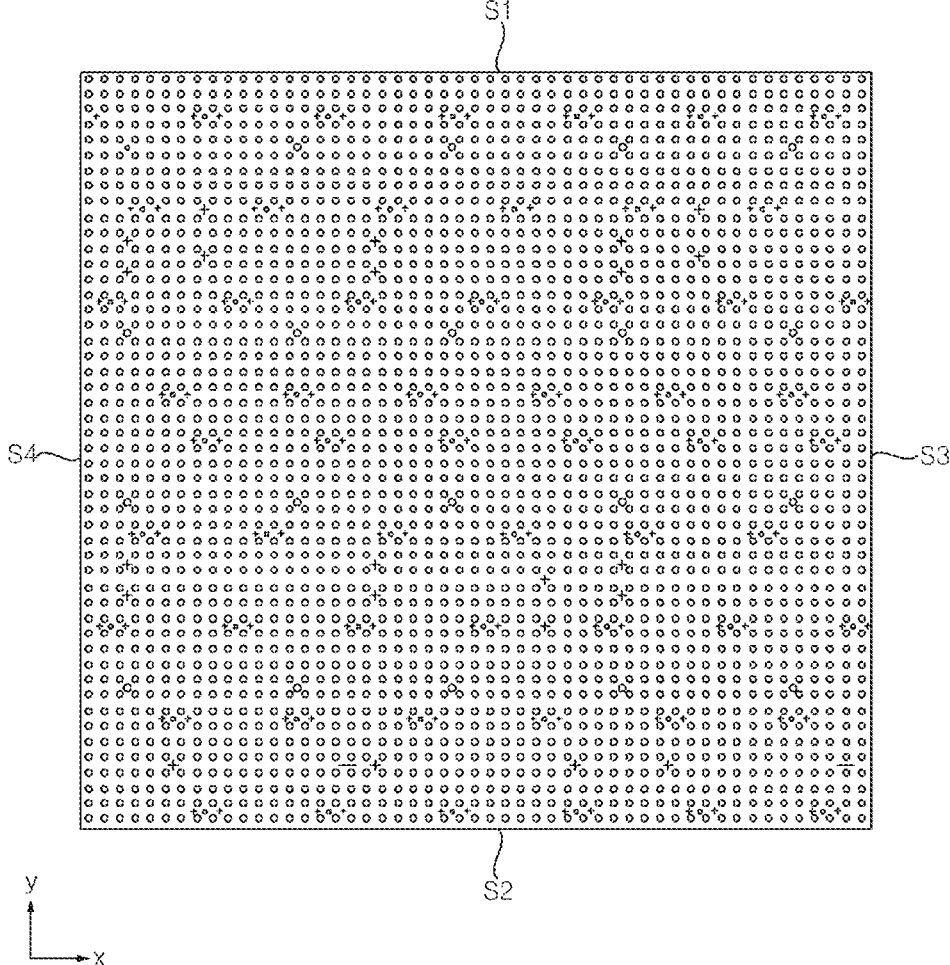

[FIG. 19]
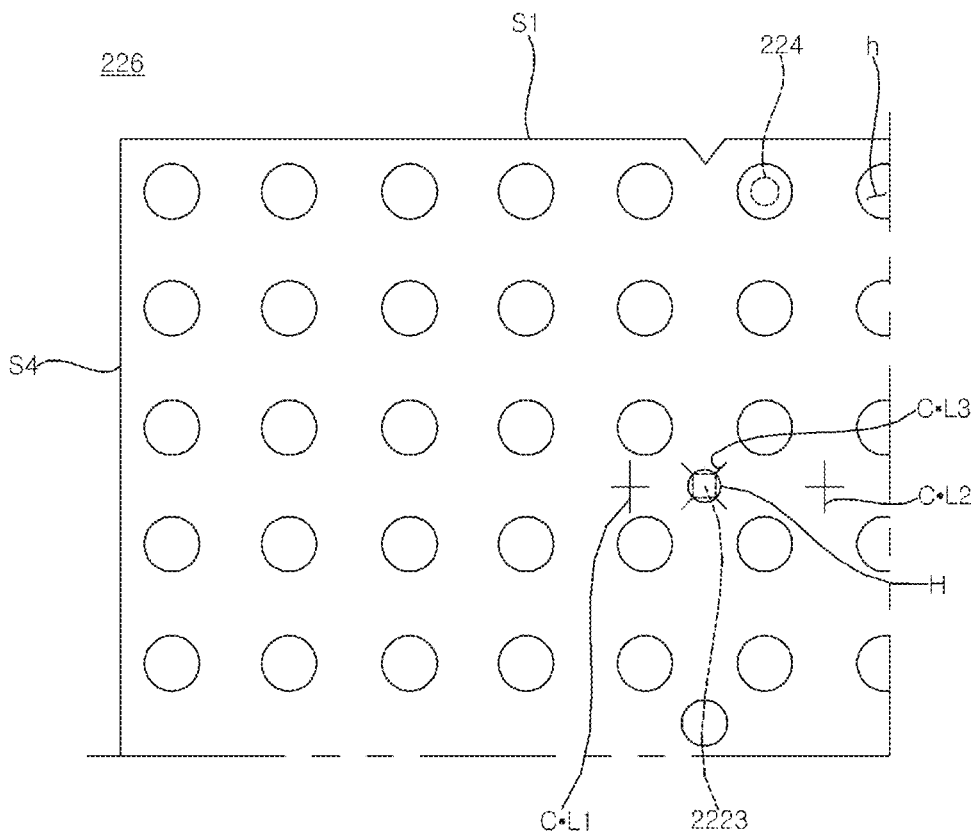

[FIG. 20]
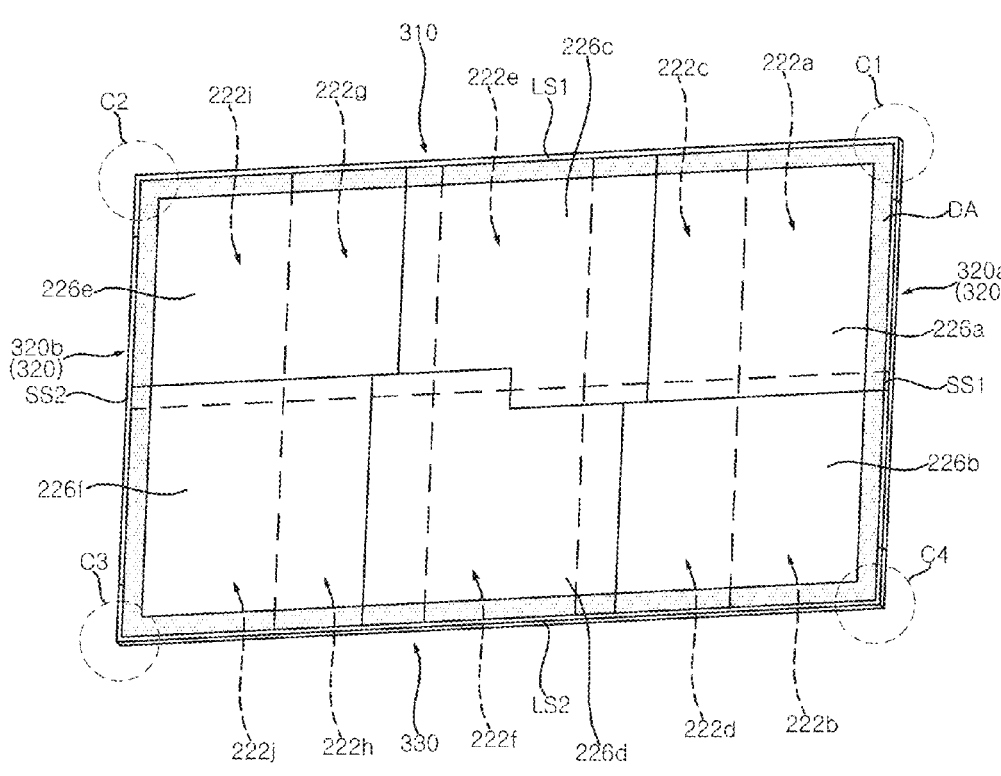

[FIG. 21]
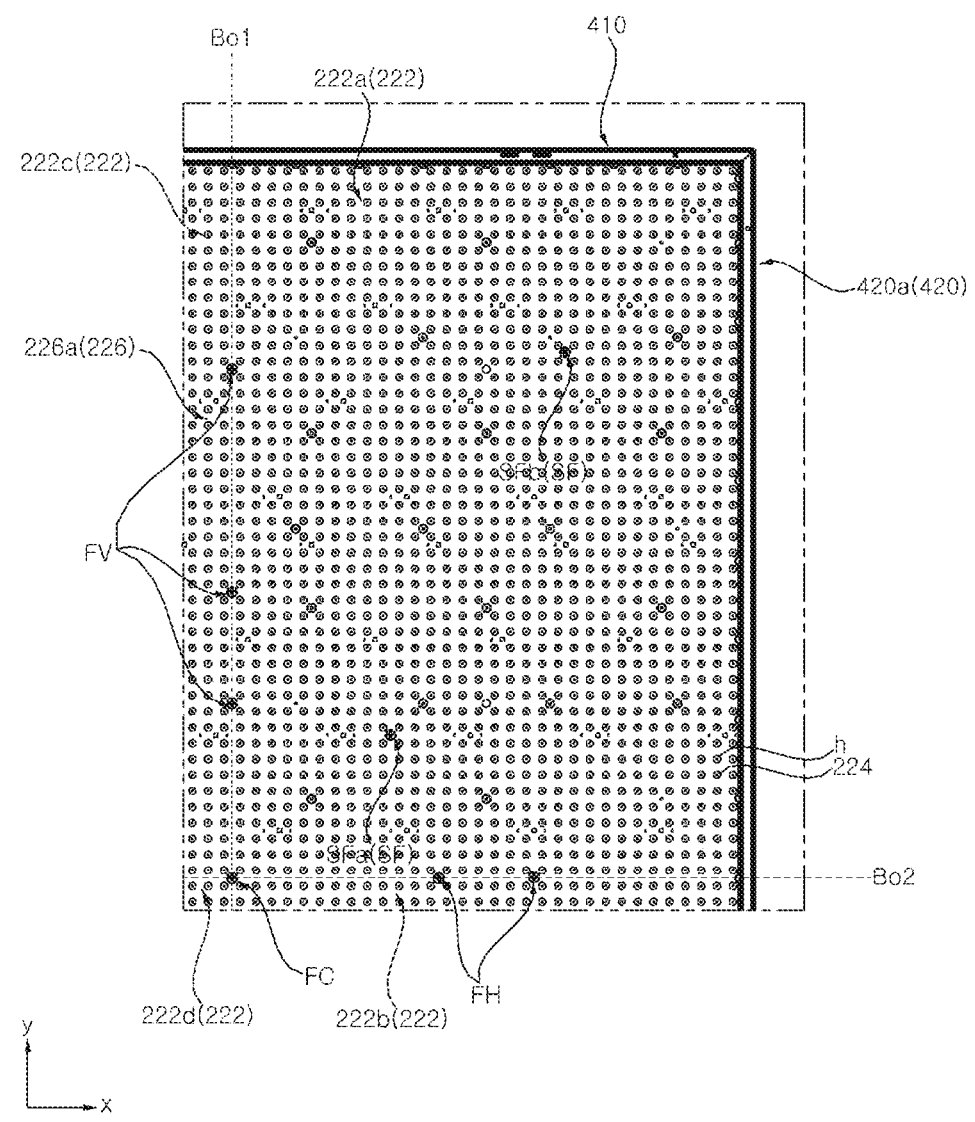

[FIG. 22]

[FIG. 23]
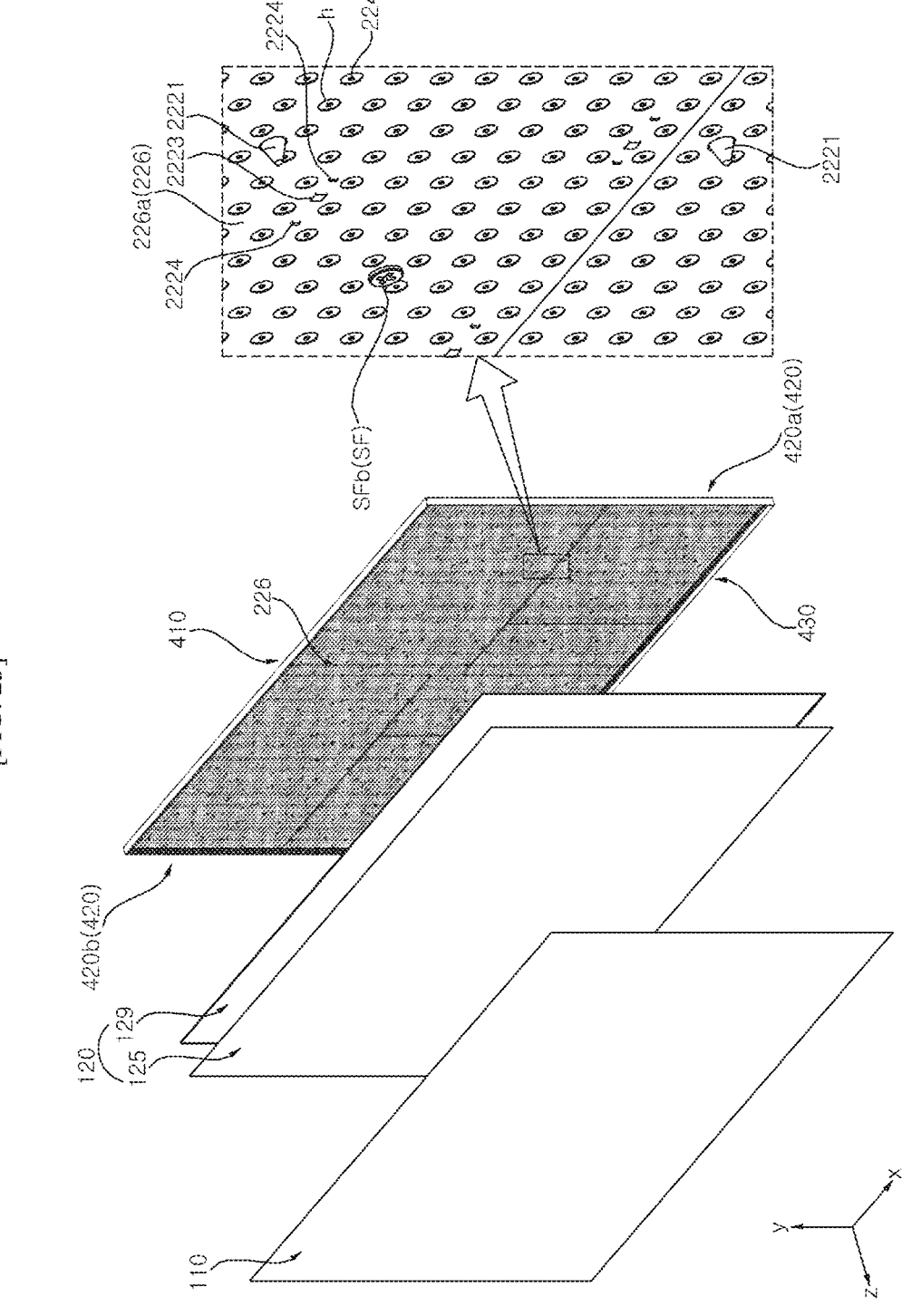

[FIG. 24]
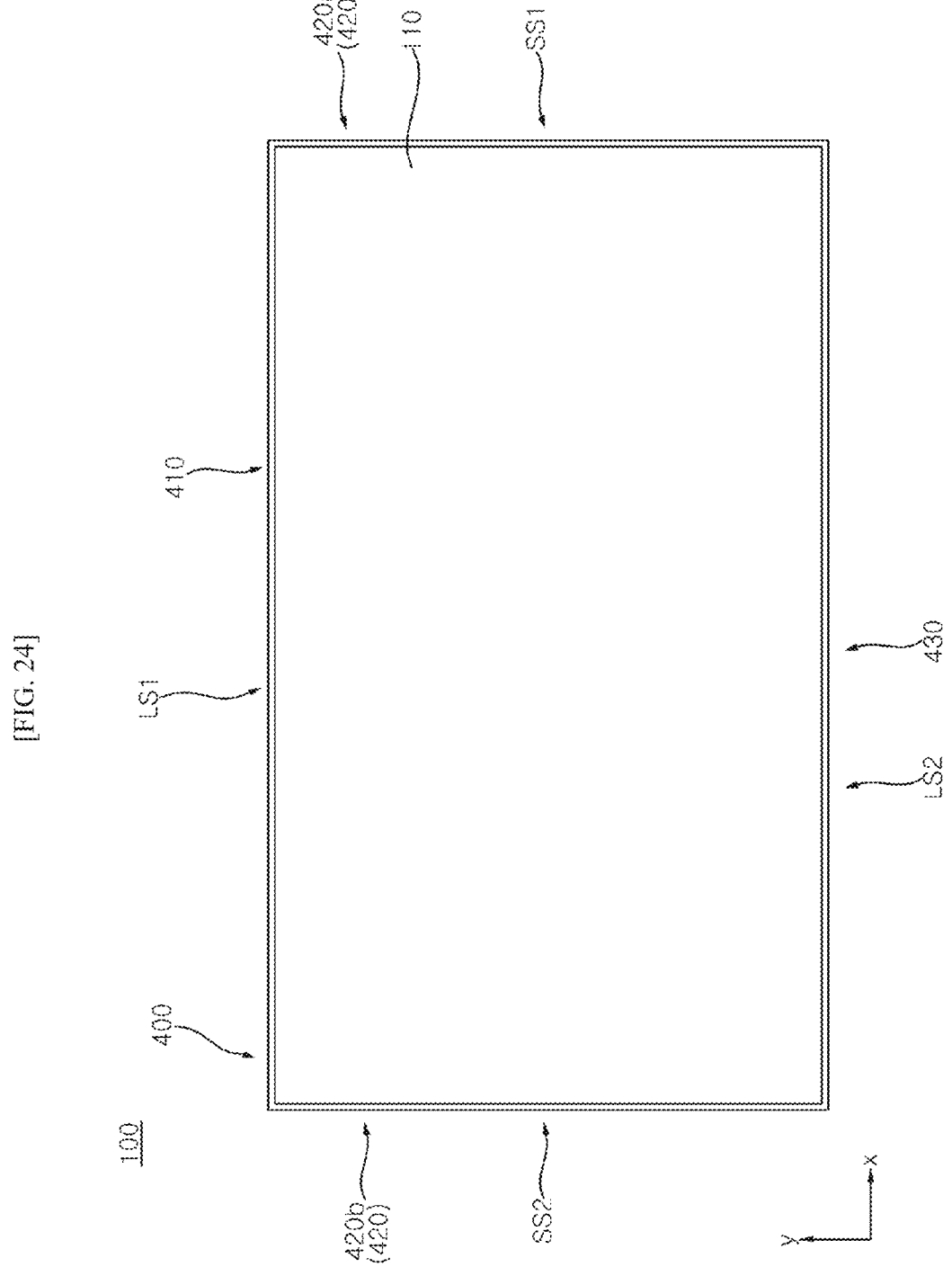

[FIG. 25]
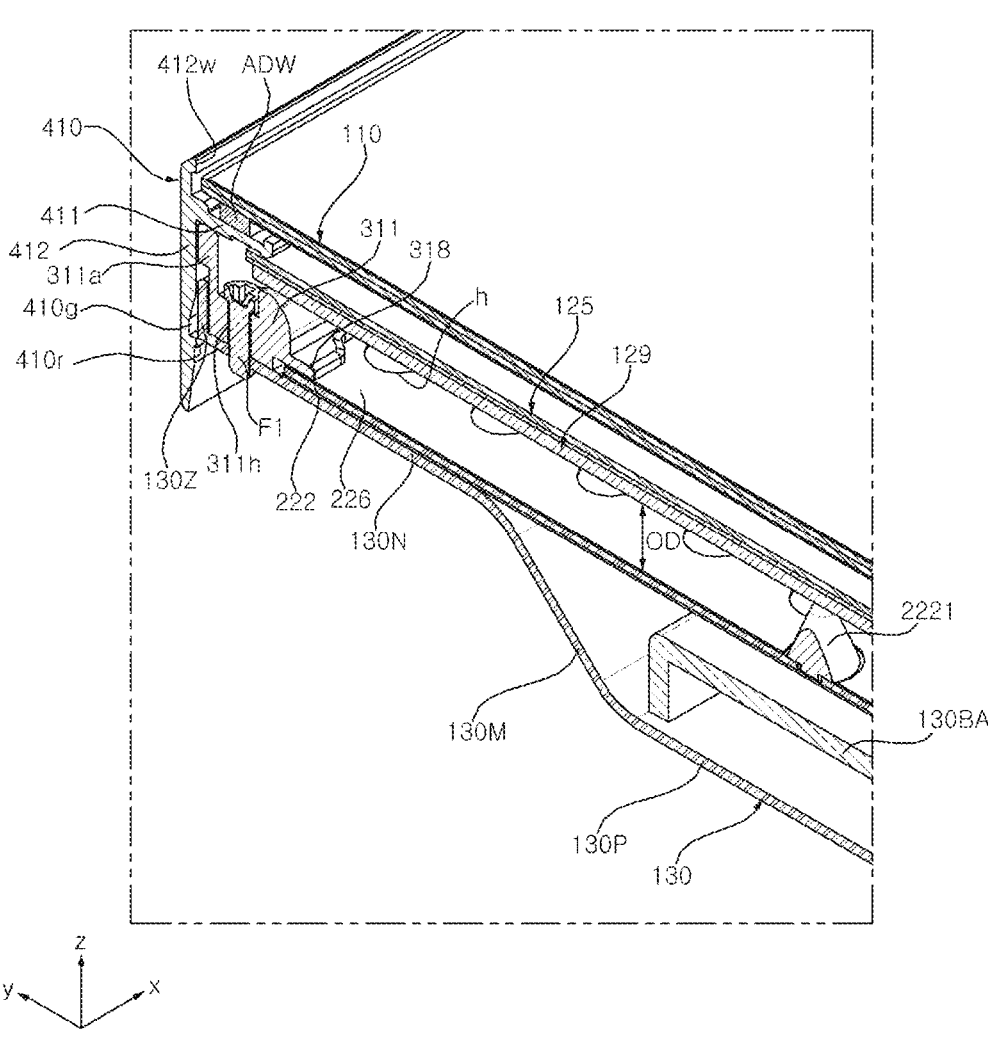

[FIG. 26]
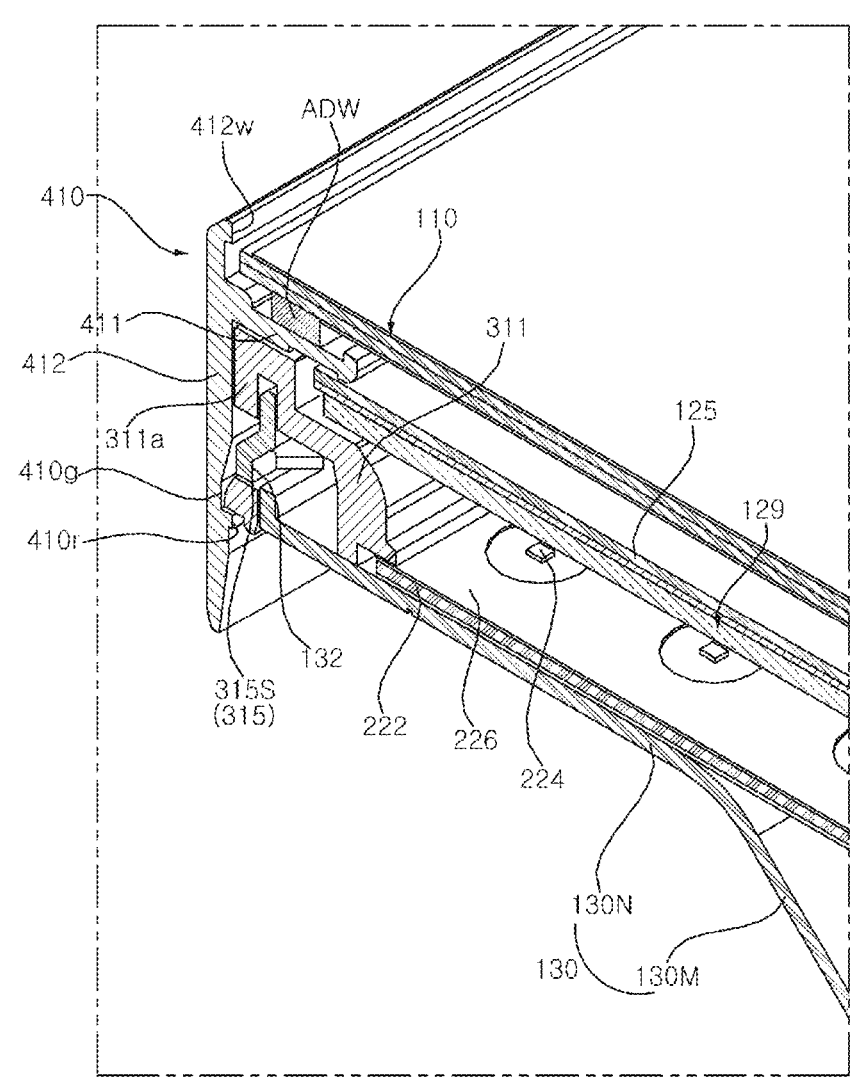
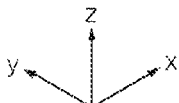

[FIG. 27]
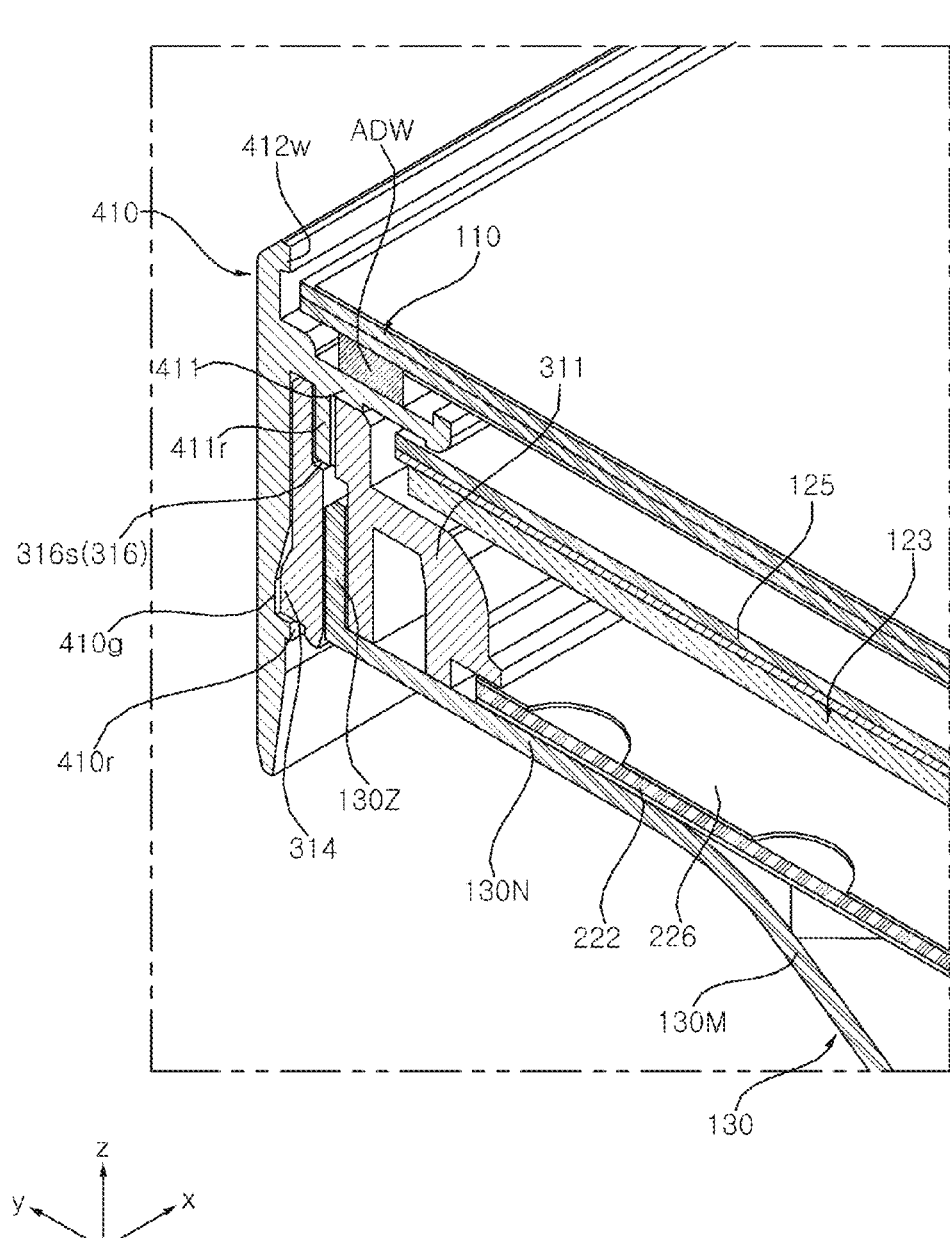

[FIG. 28]
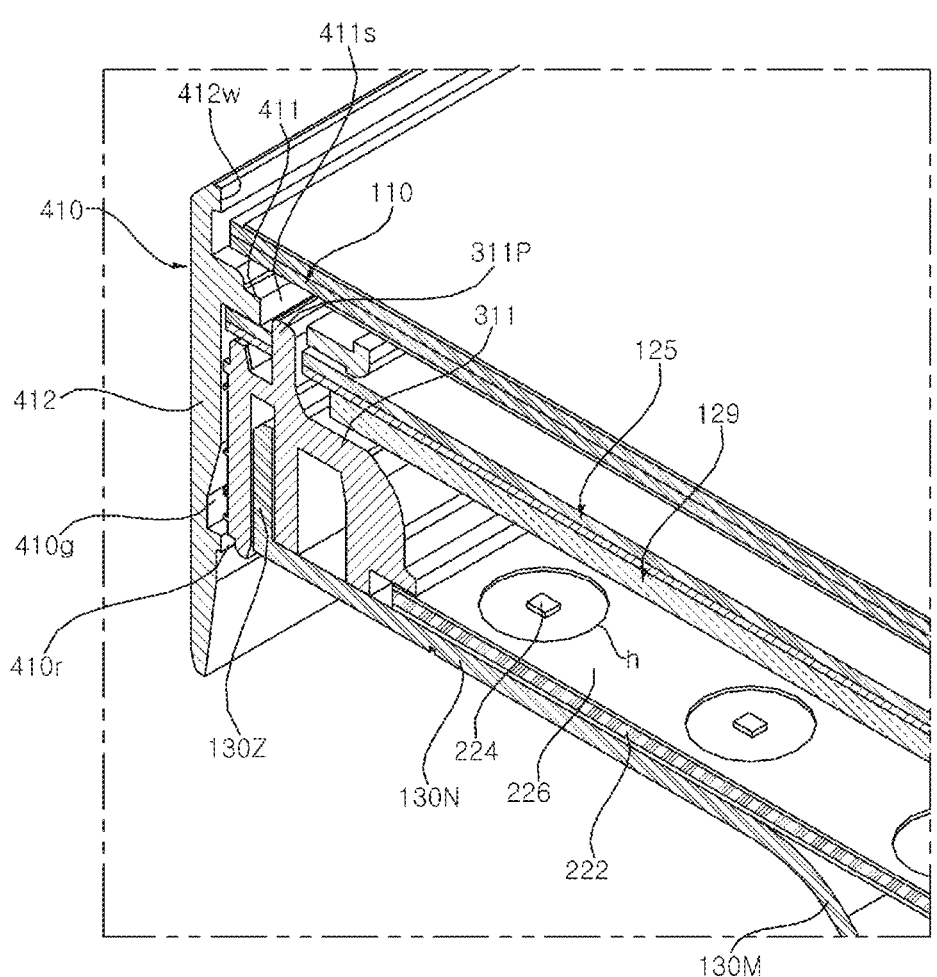
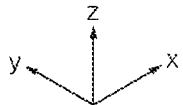

DISPLAY DEVICE

CROSS-REFERENCE TO RELATED APPLICATION(S)

This application is the National Stage filing under 35 U.S.C. 371 of International Application No. PCT/KR2022/010123, filed on Jul. 12, 2022, the contents of which is hereby incorporated by reference herein in its entirety.

TECHNICAL FIELD

The present disclosure relates to a display device.

BACKGROUND ART

As the information society develops, the demand for display devices is also increasing in various forms, and in response to this, various display devices such as Liquid Crystal Display Device (LCD), Plasma Display Panel (PDP), Electro luminescent Display (ELD), Vacuum Fluorescent Display (VFD), and Organic Light Emitting Diode (OLED) have been studied and used recently.

Among these, the LCD panel has a TFT substrate and a color substrate that are opposite to each other with a liquid crystal layer interposed therebetween, and can display an image by using light provided from a backlight unit. In addition, an OLED panel can display an image by depositing an organic layer that can emit light for itself on a substrate on which a transparent electrode is formed.

In particular, the backlight unit of a display device using an LCD panel has a substrate on which light sources are mounted, and this substrate may be grounded to a frame of the display device.

DETAILED DESCRIPTION OF INVENTION

Technical Problems

It is an object of the present disclosure to solve the above-described problems and other problems.

Another object may be to provide a structure capable of fixing a substrate to a frame.

Another object may be to provide a structure capable of grounding the substrate to the frame.

Another object may be to provide a structure capable of resolving grounding instability between the substrate and the frame due to lifting of the substrate under a high temperature condition.

Technical Solution

According to an aspect of the present disclosure for achieving the above and other objects, a display device may include: a display panel; a frame located behind the display panel; a substrate located between the display panel and the frame and coupled to the frame; a light source mounted to the substrate and providing light to the display panel; a fastening member passing through the substrate, coupled to the frame, and pressing the substrate toward the frame; and a pad located between the substrate and the frame, contacting with the rear surface of the substrate and the front surface of the frame, and through which the fastening member passes.

Effect of Invention

The effects of the display device according to the present disclosure will be described as follows.

According to at least one of the embodiments of the present disclosure, it is possible to provide a structure capable of fixing a substrate to a frame.

According to at least one of the embodiments of the present disclosure, it is possible to provide a structure capable of grounding the substrate to the frame.

According to at least one of the embodiments of the present disclosure, it is possible to provide a structure capable of resolving grounding instability between the substrate and the frame due to lifting of the substrate under a high temperature condition.

Further scope of applicability of the present disclosure will become apparent from the following detailed description. However, it should be understood that the detailed description and specific embodiments such as preferred embodiments of the present disclosure are given by way of illustration only, since various changes and modifications within the spirit and scope of the present disclosure may be clearly understood by those skilled in the art.

BRIEF DESCRIPTION OF THE DRAWING

FIGS. 1 to 28 are diagrams illustrating examples of a display device according to embodiments of the present disclosure.

MODE FOR CARRYING OUT THE INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

Direction indications of up (U), down (D), left (Le), right (Ri), front (F), and rear (R) shown in the drawings are only for convenience of explanation, and the technical concept disclosed in this specification is not limited thereto.

Referring to FIG. 1, a display device 100 may include a display panel 110. The display panel 110 may display an image.

The display device 100 may include a first long side LS1, a second long side LS2 opposite to the first long side LS1, a first short side SS1 adjacent to the first and second long sides LS1 and LS2, and a second short side SS2 opposite to the first short side SS1. Meanwhile, for convenience of description, it is illustrated that the length of the long side LS1, LS2 is larger than the length of the short side SS1, SS2, but it may also be possible that the lengths of the long side LS1, LS2 is substantially equal to the length of short side SS1, SS2.

The direction parallel to the long sides LS1 and LS2 of display device 100 may be referred to as a left-right direction or a first direction DR1. The direction parallel to the short sides SS1 and SS2 of the display device 100 may be referred to as a vertical direction or a second direction DR2. The direction perpendicular to the long sides LS1 and LS2 and the short sides SS1 and SS2 of the display device 100 may be referred to as a forward/rearward direction or a third direction DR3.

The direction in which the display panel 110 displays images may be referred to as a forward direction (F, z), and the opposite direction may be referred to as a rearward direction R. A side of the first long side LS1 may be referred to as an upper side (U, y). A side of the second long side LS2 may be referred to as a lower side D. A side of the first short side SS1 may be referred to as a left side (Le, x). A side of the second short side SS2 may be referred to as a right side Ri.

The first long side LS1, the second long side LS2, the first short side SS1, and the second short side SS2 may be referred to as an edge of the display device 100. In addition, a point where the first long side LS1, the second long side LS2, the first short side SS1, and the second short side SS2 meet each other may be referred to as a corner.

A first corner C1 may be a point where the first short side SS1 and the first long side LS1 meet. A second corner C2 may be a point where the first long side LS1 and the second short side SS2 meet. A third corner C3 may be a point where the second short side SS2 and the second long side LS2 meet. A fourth corner C4 may be a point where the second long side LS2 and the first short side SS1 meet.

Referring to FIG. 2, the display device 100 may include a display panel 110, a case top 105, a backlight unit 120, a frame 130, and a back cover 150.

The display panel 110 may form the front surface of the display device 100, and may display an image. The display panel 110 may display an image by having a plurality of pixels that output Red, Green or Blue (RGB) for each pixel in accordance with a timing. The display panel 110 may be divided into an active area where an image is displayed and a de-active area where an image is not displayed. The display panel 110 may include a front substrate and a rear substrate that are opposite to each other with a liquid crystal layer interposed therebetween. The display panel 110 may be referred to as an LCD panel.

The front substrate may include a plurality of pixels consisting of red, green, and blue subpixels. The front substrate may output a light corresponding to the color of red, green, or blue depending on a control signal.

The rear substrate may include switching elements. The rear substrate may switch a pixel electrode. For example, the pixel electrode may change the molecular arrangement of a liquid crystal layer according to an externally input control signal. The liquid crystal layer may include liquid crystal molecules. The arrangement of liquid crystal molecules may change in response to a voltage difference generated between the pixel electrode and a common electrode. The liquid crystal layer may transmit or block a light provided from the backlight unit 120 to the front substrate.

The side cover of the case top 105 may cover the edge of the display panel 110, and the front cover of the case top 105 may cover a portion of the front surface of the display panel 110. Any one of the side cover and the front cover may be omitted. The case top 105 may be referred to as an end cover 105, a guide panel 105, or an outer frame 105.

The backlight unit 120 may be located in a rear of the display panel 110. The backlight unit 120 may include light sources. The backlight unit 120 may be coupled to the frame 130 in front of the frame 130. The backlight unit 120 may be driven by a full driving method or a partial driving method such as local dimming, and impulsive driving. The backlight unit 120 may include an optical sheet 125 and an optical layer 123.

The optical sheet 125 may evenly transmit light from the light source to the display panel 110. The optical sheet 125 may be composed of a plurality of layers. For example, the optical sheet 125 may include a prism sheet or a diffusion sheet.

The frame 130 may be located in a rear of the backlight unit 120, and may support the components of the display device 100. For example, the frame 130 may include a metal material such as an aluminum alloy. The frame 130 may be referred to as a main frame 130, a module cover 130, or a cover bottom 130.

The back cover 150 may cover the rear of the frame 130. The back cover 150 may be coupled to the frame 130. For example, the back cover 150 may include a metal or plastic material.

Referring to FIG. 3, the optical layer 123 may include a substrate 122, at least one optical assembly 124, a reflective sheet 126, and a diffusion plate 129. The optical sheet 125 may be located in front of the optical layer 123.

The substrate 122 may extend in the left-right direction, and may be provided in the form of a plurality of straps spaced apart from each other in the up-down direction. At least one optical assembly 124 may be mounted on the substrate 122. An electrode pattern may be formed on the substrate 122 to connect an adapter and the optical assembly 124. The power supply board of the display device may provide power to the optical assembly 124 through the substrate 122. For example, the electrode pattern may be a carbon nanotube electrode pattern. The substrate 122 may be composed of at least one of polyethylene terephthalate (PET), glass, polycarbonate (PC), and silicon. The substrate 122 may be a printed circuit board (PCB) on which at least one optical assembly 124 is mounted.

The optical assembly 124 may be a light emitting diode (LED) chip or a light emitting diode package including at least one light emitting diode chip. The optical assembly 124 may be composed of a colored LED or a white LED that emits at least one color among colors such as red, green, and blue. The colored LED may include at least one of red LED, green LED, and blue LED. For example, the optical assembly 124 may be a mini LED. The optical assembly 124 may be referred to as a light source 124.

The reflective sheet 126 may be located in front of the substrate 122. At least one hole 235 may be formed to penetrate the reflective sheet 126, and the optical assembly 124 may be located in the hole 235. The reflective sheet 126 may reflect a light provided from the optical assembly 124 or reflected from the diffusion plate 129 forward. For example, the reflective sheet 126 may include a metal having a high reflectivity, such as at least one of aluminum (Al), silver (Ag), gold (Au), and titanium dioxide (TiO2) and/or metal oxide.

In addition, an air gap may be formed between the reflective sheet 126 and the diffusion plate 129. The air gap may serve as a buffer, and the light provided from the optical assembly 124 may be spread widely by the air gap. A supporter 220 may be located between the reflective sheet 126 and the diffusion plate 129, and may form the air gap.

The diffusion plate 129 may be located in front of the reflective sheet 126. The diffusion plate 129 may be located between the reflective sheet 126 and the optical sheet 125.

The optical sheet 125 may include at least one sheet. For example, the optical sheet 125 may include one or more prism sheets and/or one or more diffusion sheets. A plurality of sheets of the optical sheet 125 may be adhered to or in close contact with each other. Meanwhile, a coupling portion 125*d* of the optical sheet 125 may be coupled to the frame 130 and/or the back cover 150 (see FIG. 2).

Specifically, the optical sheet 125 may be composed of a plurality of sheets having different functions. For example, the optical sheet 125 may include a first optical sheet 125*a*, a second optical sheet 125*b*, and a third optical sheet 125*c*. For example, the first optical sheet 125*a* may be a diffusion sheet, and the second optical sheet 125*b* and the third optical sheet 125*c* may be a prism sheet. The diffusion sheet may prevent the light emitting from the diffusion plate 129 from being partially concentrated, thereby making the distribution of light more uniform. The prism sheet may condense the light emitting from the diffusion plate 129 and provide it to the display panel 110. Meanwhile, the number and/or location of the diffusion sheet and the prism sheet may be changed.

Referring to FIG. 4, the frame 130 may include a metal material. At least one bar 130Ba, 130Bb may be coupled to the front surface of the frame 130. A first bar 130Ba may be adjacent to the upper side 130U of the frame 130, and may be extended long between the left side 130L and the right side 130R of the frame 130. A second bar 130Bb may be adjacent to the lower side 130D of the frame 130, and may be extended long between the left side 130L and the right side 130R of the frame 130. The first bar 130Ba and the second bar 130Bb may be located in a recessed portion of the frame 130.

The frame 130 may have a plurality of connector holes 130Ha, 130Hb, 130Hc, 130Hd, 130He, 130Hf, 130Hg, 130Hh, 130Hi, and 130Hj. A first connector hole 130Ha, a second connector hole 130Hb, a third connector hole 130Hc, a fourth connector hole 130Hd, a fifth connector hole 130He, a sixth connector hole 130Hf, a seventh connector hole 130Hg, an eighth connector hole 130Hh, a ninth connector hole 130Hi, and a tenth connector hole 130Hj may be sequentially arranged along a virtual horizontal line passing through the center of the frame 130.

Referring to FIGS. 5 and 6, the substrate 222 may be a plate. The front surface of the substrate 222 may be white. A white material or a reflective material may be applied to the front surface of the substrate 222. An optical assembly 224 may be mounted on the substrate 222. The optical assembly 224 may include a light source and a mini lens. Alternatively, the optical assembly 224 may include only a light source without a lens. The optical assembly 224 may be referred to as a light source 224. For example, the light source may be a mini LED that provides blue light. For example, a plurality of light assemblies 224 may be arranged in a plurality of rows and columns on the substrate 222. The substrate 222 may be referred to as a PCB 222 or an LED PCB 222.

An integrated device 2223 and a capacitor 2224 may be arranged around the light source 224. For example, the integrated device 2223 may be an IC chip 2223. A plurality of capacitors 2224 may be opposite to each other with respect to the integrated device 2223. The integrated device 2223 may control power supplied to a certain number of light sources 224.

A supporter 2221 may be located between the optical assemblies 224, and may be mounted on the substrate 222. The supporter 2221 may have an overall conical shape. The supporter 2221 may maintain a constant distance between the substrate 222 and the optical layer 129 (see FIG. 3).

Referring to FIGS. 7 to 9, an insulating sheet IS may be coupled or attached to the front surface of a flat portion 130P of the frame 130. A plurality of holes (not shown) of the insulating sheet IS may be aligned with a plurality of connector holes 130Ha, 130Hb, 130Hc, 130Hd, 130He, 130Hf, 130Hg, 130Hh, 130Hi, 130Hj of the frame 130.

The adhesive member DA may extend along the perimeter of the insulating sheet IS, and may be coupled or attached to the front surface of the frame 130 and the rear surface of the substrate 222. A first adhesive member DAa may extend along the upper side of the frame 130. A second adhesive member DAb may extend along the lower side of the frame 130. A third adhesive member DAc may extend along the left side of the frame 130. A fourth adhesive member Dad may extend along the right side of the frame 130. For example, the adhesive member DA may be a double-sided tape.

There may be a plurality of substrates 222. The plurality of substrates 222 may include a first substrate 222*a*, a second substrate 222*b*, a third substrate 222*c*, a fourth substrate 222*d*, a fifth substrate 222*e*, a sixth substrate 222*f*, a seventh substrate 222*g*, an eighth substrate 222*h*, a ninth substrate 222*i*, and a tenth substrate 222*j*.

The first substrate 222*a* may be located in contact with the first long side LS1 and the first short side SS1, and may form a first corner C1. The second substrate 222*b* may be located in contact with the first short side SS1 and the second long side LS2, and may form a fourth corner C4. The second substrate 222*b* may be next to the first substrate 222*a* in the up-down direction.

The ninth substrate 222*i* may be located in contact with the first long side LS1 and the second short side SS2, and may form a second corner C2. The tenth substrate 222*j* may be located in contact with the second short side SS2 and the second long side LS2, and may form a third corner C3. The tenth substrate 222*j* may be next to the ninth substrate 222*i* in the up-down direction.

The fifth substrate 222*e* may be in contact with the first long side LS1, and located between the first substrate 222*a* and the ninth substrate 222*i*. The sixth substrate 222*f* may be in contact with the second long side LS2, and located between the second substrate 222*d* and the tenth substrate 222*j*. The sixth substrate 222*f* may be next to the fifth substrate 222*e* in the up-down direction.

The third substrate 222*c* may be in contact with the first long side LS1 and located between the first substrate 222*a* and the fifth substrate 222*e*. The fourth substrate 222*d* may be in contact with the second long side LS2 and located between the second substrate 222*b* and the sixth substrate 222*f*. The fourth substrate 222*d* may be next to the third substrate 222*c* in the up-down direction.

The seventh substrate 222*g* may be in contact with the first long side LS1 and may be located between the fifth substrate 222*e* and the ninth substrate 222*i*. The eighth substrate 222*h* may be in contact with the second long side LS2 and may be located between the sixth substrate 222*f* and the tenth substrate 222*j*. The eighth substrate 222*h* may be next to the seventh substrate 222*g* in the up-down direction.

Referring to FIGS. 8 and 10, the flat portion 130P of the frame 130 may form the front surface of the frame 130, and may be formed flat. A hole 130Fh may be formed in the flat portion 130P. A pad 130E may be located on the flat portion 130P, and may be coupled or attached to the flat portion 130P. The pad 130E may have a hole aligned with the hole 130Fh. The diameter of the hole of the pad 130E may be equal to or larger than the diameter of the hole 130Fh. The pad 130E may be referred to as a ring pad 130E, an EMI pad 130E, or a gasket 130E. A sheet hole ISH may be formed in the insulating sheet IS and aligned with the hole 130Fh. The diameter of the sheet hole 1SH may be equal to or larger than the diameter of the pad 130E. A substrate hole 222Hh may be formed in the substrate 222 and aligned with the hole 130Fh. The diameter of the substrate hole 222Hh may be equal to or larger than the diameter of the hole 130Fh.

A first hole 130Fha and a second hole 130Fhb may be formed on the flat portion 130P, and may be spaced apart from each other. A first pad 130Ea may be located on the flat portion 130P, and may have a hole aligned with the first hole 130Fha. A first sheet hole ISHa may be formed in the insulating sheet IS, and may be aligned with the first hole 130Fha. A first substrate hole 222Ha may be formed in the substrate 222, and may be aligned with the first hole 130Fha. A second pad 130Eb may be located on the flat portion 130P, and may have a hole aligned with the second hole 130Fhb. A second sheet hole ISHb may be formed in the insulating sheet IS, and may be aligned with the second hole 130Fhb. A second substrate hole 222Hb may be formed in the substrate 222, and may be aligned with the second hole 130Fhb.

The contents related to the above-described hole 130Fha, 130Fhb, pad 130Ea, 130Eb, sheet hole ISHa, ISHb, and substrate hole 222Ha, 222Hb may be applied to each of the plurality of substrates 222.

Referring to FIGS. 11 and 12, a first connector 222*a*T may be mounted on the rear surface of the first substrate 222*a*, and may be located in the first connector hole 130Ha. The second connector 222*b*T may be mounted on the rear surface of the second substrate 222*b*, and may be located in the second connector hole 130Hb. The third connector 222*c*T may be mounted on the rear surface of the third substrate 222*c*, and may be located in the third connector hole 130Hc. The fourth connector 222*d*T may be mounted on the rear surface of the fourth substrate 222*d*, and may be located in the fourth connector hole 130Hd. The fifth connector 222*e*T may be mounted on the rear surface of the fifth substrate 222*e*, and may be located in the fifth connector hole 130He. The sixth connector 222*f*T may be mounted on the rear surface of the sixth substrate 222*f*, and may be located in the sixth connector hole 130Hf. The seventh connector 222*g*T may be mounted on the rear surface of the seventh substrate 222*g*, and may be located in the seventh connector hole 130Fg. The eighth connector 222*h*T may be mounted on the rear surface of the eighth substrate 222*h*, and may be located in the eighth connector hole 130Hh. The ninth connector 222*i*T may be mounted on the rear surface of the ninth substrate 222*i*, and may be located in the ninth connector hole 130Hi. The tenth connector 220*j*T may be mounted on the rear surface of the tenth substrate 220*j*, and may be located in the tenth connector hole 130Hj.

A power supply board (PSU) may be mounted on the rear surface of the frame 130. The power supply board (PSU) may supply power to each component of the display device. The power supply board (PSU) may be electrically connected to a plurality of connectors 222*a*T, 222*b*T, 222*c*T, 222*d*T, 222*e*T, 222*f*T, 222*g*T, 222*h*T, 222*i*T, 222*j*T through a cable and may provide power to a light source 2224 (see FIG. 6).

A timing controller board TC may be mounted on the rear surface of the frame 130. The timing controller board TC may be electrically connected to a source PCB PCa, PC through a cable such as a flexible flat cable (FFC), and the source PCB PCa, PCb may be electrically connected to the lower side of the display panel 110 through a cable such as a chip on film (COF). The timing controller board TC may provide an image signal to the display panel 110.

A main board (not shown) may be mounted on the rear surface of the frame 130, and may control the component of the display device.

Referring to FIG. 13, a fixing portion 130PN may protrude in a rearward direction from the flat portion 130P, and the first hole 130Fha may be formed on the inner side of the fixing portion 130PN. The first pad 130Ea may be located on the flat portion 130P, and the inner diameter DEa of the ring-shaped first pad 130Ea may be equal to or larger than the diameter of the first hole 130Fha.

The insulating sheet IS may be located on the flat portion 130P, and the diameter of the first sheet hole ISHa may be larger than the outer diameter DEaa of the first pad 130Ea. Meanwhile, the first groove 130Va may be located between the first pad 130Ea and the insulating sheet IS, and may extend along the outer circumference of the first pad 130Ea. The first groove 130Va may guide the coupling location of the flat portion 130P and the first pad 130Ea.

The substrate 222 may cover an insulating sheet IS, a first pad 130Ea, and a portion of a flat portion 130P located between the insulating sheet IS and the first pad 130Ea. A diameter DHa of a first substrate hole 222Ha of the substrate 222 may be equal to or smaller than an inner diameter DEa of the first pad 130Ea, and may be equal to or larger than a diameter of the first hole 130Fha.

The rear surface of the substrate 222 may be adjacent to or in contact with the front surface of the insulating sheet IS. A first ring 222Qa may be provided on the substrate 222, and may form a portion of the rear surface of the substrate 222. The first ring 222Qa may face the first pad 130Ea, and may be in contact with the first pad 130Ea. The inner diameter and the outer diameter of the first ring 222Qa may be equal to or larger than the inner diameter DEa and the outer diameter DEaa of the first pad 130Ea, respectively. The frame 130 may include a metal material, and the first ring 222Qa and the first pad 130Ea may be conductive. The first ring 222Qa may include a copper material, and the first pad 130Ea may be a foam pad that can be compressed or restored in the thickness direction. Meanwhile, a conductor having a different shape from the above described first ring 222Qa may be provided on the rear surface of the substrate 222 and electrically connected to the first pad 130Ea. Alternatively, a conductive portion as a part of the rear surface of the substrate 222 without the above described first ring 222Qa may be electrically connected to the first pad 130Ea.

The first fastening member SFa may include a body SFn and a head SFm. The body SFn may penetrate the first substrate hole 222Ha, the first pad 130Ea, and the first hole 130Fha of the substrate 222, and may be fastened to the fixing member 130PN. The head SFm may protrude in the radial direction of the body SFn from the front end of the body SFn, and may contact the front surface of the substrate 222. For example, the first fastening member SFa may be a screw. Accordingly, the head SFm of the first fastening member SFa may press the substrate 222 and the first pad 130Ea toward the flat portion 130P. At this time, the first pad 130Ea having elasticity may be compressed. Due to the elasticity of the first pad 130Ea, the first pad 130Ea pressed toward the flat portion 130P by the first fastening member SFa can be better attached to the flat portion 130P.

The thickness Te of the first pad 130Ea may be equal to or larger than the thickness Ti of the insulating sheet IS. For example, the thickness Te of the first pad 130Ea may be 0.1 to 0.8 mm. For example, the thickness Te of the first pad 130Ea may be 0.4 mm. Accordingly, the first pad 130Ea may secure the grounding function of the frame 130 described below to the maximum extent while minimizing the difference in optical depth OD (see FIG. 25) or brightness difference between the area corresponding to the first pad 130Ea and the other area. Here, the optical depth OD may be a distance between the substrate 222 or a reflective sheet 226 and the diffusion plate 129 (see FIG. 25).

The head SFm may be located between the light sources 224. The diameter DMa of the head SFm may be smaller than the gap Dg between the light sources 224. The diameter DMa of the head SFm may be larger than the inner diameter DEa of the first pad 130Ea but smaller than the outer diameter DEaa. Accordingly, the unevenness of the light of the light source 224 reaching the display panel 110 due to the head SFm may be minimized, and the ground function of the frame 130 electrically connected to the substrate 222 through the first ring 222Qa and the first pad 130Ea may be sufficiently secured.

At this time, in the front-rear direction, the first pad 130Ea may include a first area E1 overlapping with the head SFm and a second area E2 not overlapping with the head SFm. In addition, in the front-rear direction, the first ring 222Qa may include a first portion Q1 overlapping with the first area E1 and a second portion Q2 overlapping with the second area E2. That is, the head SFm may press a portion of the substrate 222 corresponding to the first area E1 and the first portion Q1 toward the flat portion 130P.

Referring to FIGS. 14 to 17, a vertical boundary line and a horizontal boundary line may be formed between a plurality of substrates 222. For example, a vertical boundary line Bo1 may be formed between the first substrate 222a and the third substrate 222c, and between the second substrate 222b and the fourth substrate 222d. For example, a horizontal boundary line Bo2 may be formed between the first substrate 222a and the second substrate 222b, and between the third substrate 222c and the fourth substrate 222d.

A plurality of vertical fastening members FV may be spaced apart from each other along the vertical boundary line Bo1, and may be fastened to the frame 130 by penetrating the substrate 222. The head of the vertical fastening member FV may cover a portion of the vertical boundary line Bo1, and may press the substrate 222 located in the left and right of the vertical boundary line Bo1 toward the frame 130. The vertical fastening member FV may be a screw. At a location corresponding to the vertical fastening member FV, the frame 130 may have a ground function with respect to the substrate 222. The vertical fastening member FV can be referred to as an outer fastening member FV.

A plurality of horizontal fastening members FH may be spaced apart from each other along the horizontal boundary line Bo2, and may be fastened to the frame 130 by penetrating the substrate 222. The head of the horizontal fastening member FH may cover a portion of the horizontal boundary line Bo2, and may press the substrate 222 located above and below the horizontal boundary line Bo2 toward the frame 130. The horizontal fastening member FH may be a screw. At a location corresponding to the horizontal fastening member FH, the frame 130 may have a ground function with respect to the substrate 222. The horizontal fastening member FH may be referred to as an outer fastening member FH.

The corner fastening member FC may be located at a point of intersection of the vertical boundary line Bo1 and the vertical boundary line Bo2, and may be fastened to the frame 130 by penetrating the substrate 222. The head of the corner fastening member FC may cover the point of intersection, and may press the substrate 222 located around the point of intersection toward the frame 130. At the location corresponding to the corner fastening member FC, the frame 130 may have a ground function with respect to the substrate 222. The corner fastening member FC may be referred to as a corner fastening member FC.

The fastening member SF may be fastened to the frame 130 by penetrating the first substrate 222a. The fastening member SF may be fastened to the frame 130 by penetrating each of the plurality of substrates 222 like the first substrate 222a. The number of fastening members SF may be 1, or 2 or more. The content related to the first fastening member SFa described above with reference to FIG. 13 may be identically applied to a single fastening members SF or to each of 2 or more fastening members SF. The fastening member SF may be referred to as an inner fastening member SF.

Referring to FIG. 14, the first fastening member SFa and the second fastening member SFb may be spaced apart from each other in a diagonal direction. In a quadrant defined by a vertical line VV' and a horizontal line HH' passing through the center of the substrate 222, the first fastening member SFa may be located in a third quadrant III, and the second fastening member SFb may be located in a first quadrant I. When the substrate 222 is thermally expanded, the remaining portions of the substrate 222 located between the fixed portions of the substrate 222 fixed to the frame 130 by the fastening members SFa, SFb, FV, FH, FC can be lifted toward the front of the frame 130.

At this time, the first pad 130Ea (see FIGS. 13 and 8) through which the first fastening member SFa penetrates may be located between the first ring 222Qa and the frame 130, and the second portion Q2 of the first ring 222Qa may be lifted together with the remaining portions of the substrate 222. In this case, the contact area between the second portion Q2 and the second area E2 may be larger than the contact area between the second portion Q2 and the flat portion 130P in the case where the second portion Q2 is in direct contact with the flat portion 130P due to no first pad 130Ea. In addition, if the first pad 130Ea has elasticity, the thickness of the second area E2 of the first pad 130Ea, which was compressed in response to the lifting of the second portion Q2, may increase, and the contact between the second portion Q2 and the second area E2 may be maintained to the maximum extent. The description with respect to the first pad 130Ea may be identically applied to the second pad 130Eb (see FIG. 8) through which the second fastening member SFb penetrates. Accordingly, even when the substrate 222 is thermally expanded or lifted, the ground function of the frame 130 can be stably maintained.

Referring to FIG. 15, the first fastening member SFa and the second fastening member SFb may be spaced apart from each other on the vertical line VV'. When the substrate 222 is thermally expanded, the remaining portions of the substrate 222 located between the fixed portions of the substrate 222 fixed to the frame 130 by the fastening members SFa, SFb, FV, FH, FC can float toward the front of the frame 130.

At this time, the first pad 130Ea (see FIG. 13) through which the first fastening member SFa penetrates may be located between the first ring 222Qa and the frame 130, and the second portion Q2 of the first ring 222Qa may be lifted together with the remaining portions of the substrate 222. In this case, the contact area between the second portion Q2 and the second area E2 may be larger than the contact area between the second portion Q2 and the flat portion 130P in the case where the second portion Q2 is in direct contact with the flat portion 130P due to no first pad 130Ea. In addition, if the first pad 130Ea has elasticity, the thickness of the second area E2 of the first pad 130Ea that was compressed in response to the lifting of the second portion Q2 may be increased, and the contact between the second portion Q2 and the second area E2 may be maintained to the maximum extent. The description of the first pad 130Ea may be identically applied to the second pad 130Eb through which the second fastening member SFb penetrates. Accordingly, the ground function of the frame 130 may be stably maintained even in the case of thermal expansion or lifting of the substrate 222.

Referring to FIG. 16, the first fastening member SFa and the second fastening member SFb may be spaced apart from each other on the horizontal line HH'. When the substrate 222 is thermally expanded, the remaining portions of the substrate 222 located between the fixed portions of the substrate 222 fixed to the frame 130 by the fastening members SFa, SFb, FV, FH, FC may be lifted toward the front of the frame 130.

At this time, the first pad 130Ea (see FIG. 13) through which the first fastening member SFa penetrates may be located between the first ring 222Qa and the frame 130, and the second portion Q2 of the first ring 222Qa may be lifted together with the remaining portions of the substrate 222. In this case, the contact area between the second portion Q2 and the second area E2 may be larger than the contact area between the second portion Q2 and the flat portion 130P in the case where the second portion Q2 is in direct contact with the flat portion 130P due to no first pad 130Ea. In addition, if the first pad 130Ea has elasticity, the thickness of the second area E2 of the first pad 130Ea that was compressed in response to the lifting of the second portion Q2 may increase, and the contact between the second portion Q2 and the second area E2 may be maintained to the maximum extent. The description of the first pad 130Ea may be identically applied to the second pad 130Eb through which the second fastening member SFb penetrates. Accordingly, the ground function of the frame 130 may be stably maintained even in the case of thermal expansion or lifting of the substrate 222.

Referring to FIG. 17, the fastening member SF may be located at the center of the substrate 222. When the substrate 222 is thermally expanded, the remaining portions of the substrate 222 located between the fixed portions of the substrate 222 that are fixed to the frame 130 by the fastening members SF, FV, FH, FC may be lifted toward the front of the frame 130.

At this time, the pad 130E (see FIG. 13) through which the fastening member SF penetrates may be located between the ring 222Q and the frame 130, and the second portion Q2 of the ring 222Qa may be lifted together with the remaining portions of the substrate 222. In this case, the contact area between the second portion Q2 and the second area E2 may be larger than the contact area between the second portion Q2 and the flat portion 130P in the case where the second portion Q2 is in direct contact with the flat portion 130P due to no pad 130E. In addition, if the pad 130E has elasticity, the thickness of the second area E2 of the pad 130E that was compressed in response to the lifting of the second portion Q2 may increase, and the contact between the second portion Q2 and the second area E2 may be maintained to the maximum extent. Accordingly, the ground function of the frame 130 may be stably maintained even in the case of thermal expansion or lifting of the substrate 222.

Referring to FIGS. 18 and 19, the reflective sheet 226 may include a first side S1, a second side S2, a third side S3, and a fourth side S4. The side S may be referred to as an edge S.

The reflective sheet 226 may include a plurality of holes h and a plurality of cut-lines CL. The plurality of holes h may be formed to correspond to the light sources 224 or the light assemblies 224. The area of the hole h may be larger than the cross-sectional area of the optical assembly 224.

The reflective sheet 226 may include an accommodating hole H. The cut-line CL3 may be formed around the accommodating hole H. The cut-line CL3 may be formed in the radial direction of the accommodating hole H. For example, the cut line CL3 may be + shaped. The accommodating hole H may be referred to as a cut-line hole H. The integrated device 2223 may be located in the accommodating hole H. The area of the accommodating hole H may be larger than the cross-sectional area of the integrated device 2223. For example, the accommodating hole H may be circular, and the integrated device 2223 may be square. A portion of the integrated device 2223 may overlap with the accommodating hole H, and the cut line CL3 around the accommodating hole H may be opened.

A cut line CL1, CL2 may be located between the holes h, and may be located adjacent to the accommodating hole H. For example, the cut line CL1, CL2 may be + shaped.

A first cut line CL1 may be located between the holes h and adjacent to the accommodating hole H. A second cut line CL2 may be opposite to the first cut line CL1 with respect to the accommodating hole H. The accommodating hole H may be located between the first cut line CL1 and the second cut line CL2. Capacitors 2224 (see FIG. 6) adjacent to the integrated device 2223 may be located below the cut lines CL1, CL2, and the cut lines CL1, CL2 may be opened.

Accordingly, the reflective sheet 226 may be prevented from being separated from the substrate 222, and the light uniformity may be improved.

Referring to FIG. 20, the reflective sheet 226 can cover a substrate 222. There may be a plurality of reflective sheets 226. The plurality of reflective sheets 226 may cover a plurality of substrates 222. The plurality of reflective sheets 226 may include a first reflective sheet 226a, a second reflective sheet 226b, a third reflective sheet 226c, a fourth reflective sheet 226d, a fifth reflective sheet 226e, and a sixth reflective sheet 226f.

The first reflective sheet 226a may cover the first substrate 222a. The first reflective sheet 226a may overlap with the second substrate 222*b*, the third substrate 222*c*, and the fourth substrate 222*d*. The second reflective sheet 226*b* may cover at least a portion or most of the second substrate 222*b* and may overlap with the fourth substrate 222*d*.

The third reflective sheet 226*c* may cover at least a portion or most of the fifth substrate 222*e*. The third reflective sheet 226*c* may overlap with the third substrate 222*c*, the fourth substrate 222*d*, the sixth substrate 222*f*, and the seventh substrate 222*g*. The fourth reflective sheet 226*d* may cover at least a portion or most of the sixth substrate 222*f*. The fourth reflective sheet 226*d* may overlap with the fourth substrate 222*d*, the fifth substrate 222*e*, the sixth substrate 222*f*, and the seventh substrate 222*g*.

The fifth reflective sheet 226*e* may cover at least a portion or most of the ninth substrate 222*i*, and may overlap with the seventh substrate 222*g*. The sixth reflective sheet 226*f* may cover the tenth substrate 222*j*. The sixth reflective sheet 226*f* may overlap with the seventh substrate 222*g*, the eighth substrate 222*h*, and the ninth substrate 222*i*.

Meanwhile, the inner frame 310, 320, 330 may be coupled to the sides 130U, 130D, 130L, 130R or edges 130U, 130D, 130L, 130R of the frame 130 (see FIG. 4). The inner frame 310, 320, 330 may include a plurality of parts. The top part 310 may be coupled to the first long side LS1 of the frame 130, and the bottom part 330 may be coupled to the second long side LS2 of the frame 130. The first side part 320*a* may be coupled to the first short side SS1 of the frame 130, and may be coupled to the top part 310 and the bottom part 330. The second side part 320*b* may be coupled to the second short side SS2 of the frame 130, and may be coupled to the top part 310 and the bottom part 330. The inner frame 310, 320, 330 may be referred to as an inner guide panel 310, 320, 330 or a middle cabinet 310, 320, 330.

Referring to FIGS. 21 and 22, the body SFn of the first fastening member SFa may penetrate the first hole 226Ha of the reflective sheet 226, and the head SFm of the first fastening member SFa may press the reflective sheet 226, the substrate 222, and the first pad 130Ea toward the flat portion 130P. The diameter of the first hole 226Ha may be equal to or smaller than the diameter DHa of the first substrate hole 222Ha.

The description of the first fastening member SFa and the reflective sheet 226 may be identically applied to the second fastening member SFb.

Referring to FIG. 23, the diffusion plate 129 may be located in front of the reflective sheet 226. A plurality of supporters 2221 mounted on the substrate 222 may penetrate the reflective sheet 226, and support the rear surface of the diffusion plate 129. The optical sheet 125 can be located on the front surface of the diffusion plate 129. The display panel 110 may be located in front of the optical sheet 125.

Referring to FIG. 24, the outer frame 400 may define the sides LS1, LS2, SS1, SS2 or edges LS1, LS2, SS1, SS2 of the display device 10000. The outer frame 400 may cover the circumference of the inner frame 310, 320, 330 (see FIG. 19), and may be coupled to the inner frame 310, 320, 330. The outer frame 400 may be referred to as a guide panel 400, a case top 400, or an end cover 400.

The outer frame 400 may include first to third parts 420*a*, 420*b*, 410 formed by bending a long extended frame, and a fourth part 430 separated from the first to third parts 420*a*, 420*b*, 410. Meanwhile, unlike the above and the following description, the modified fourth part 430 may be formed as one body with the first to third parts 420*a*, 420*b*, 410.

Referring to FIGS. 25 and 26, the frame 130 may include a flat portion 130P, an inclined portion 130M, a support portion 130N, and an insert portion 130Z. The flat portion

130P may be formed flat overall and may be spaced rearward from the substrate 222. The inclined portion 130M may be extended obliquely from the flat portion 130P. The support portion 130N may support the substrate 222. The insert portion 130Z may be bent forward around the support portion 130N.

A seating portion 311 of the top part 310 may be located above the upper side of the substrate 222 and may be located on the support portion 130N. A foot 318 may be formed on the seating portion 311, may press the substrate 222 and the reflective sheet 226 toward the support portion 130N, and may be located between the light sources 224.

The protrusion 132 may be formed in the insert portion 130Z. A slot 315S can be formed in an inner wall 311*a* of the top part 310 and may be caught by the protrusion 132. A fastening member F1 such as a screw may penetrate the seating portion 311 and be fastened to the support portion 130N.

A vertical portion 412 of the first part 410 may cover the upper side of the inner wall 311*a*, and the horizontal portion 411 of the first part 410 may be located between the inner wall 311*a* and the display panel 110. The diffusion plate 129 and the optical sheet 125 may be located between the seating portion 311 and the horizontal portion 411, and may be placed on the seating portion 311. The supporter 2221 may support the diffusion plate 129. A pad ADM may be located between the horizontal portion 411 and the display panel 110, and for example, the pad ADM may be a double-sided tape.

Referring to FIG. 27, the insert portion 130Z may be inserted into the seating portion 311. A guide rib 411*r* may protrude from the horizontal portion 411 of the first part 410 toward the seating portion 311, and may be inserted into an insertion groove 316*s*. A protrusion portion 314 may protrude from the outer surface of the inner wall 311*a* toward the vertical portion 412. A groove 410*g* may be formed on the inner side of the vertical portion 412 and may face the protrusion portion 314. The shape of the groove 410*g* may correspond to the protrusion portion 314. A hook 410*r* may be formed on the inner side of the vertical portion 412 and may define a portion of the boundary of the groove 410*g*. The hook 410*r* may be caught on the rear side of the protrusion portion 314.

Accordingly, the third part 410 may be detachably coupled to the top part 310.

Referring to FIG. 28, the rib 311P may protrude forward from the front surface of the seating portion 311, and may penetrate a coupling slot 411*s* of the optical sheet 125 and the horizontal portion 411. Here, the portion of the optical sheet 125 penetrated by the rib 311P may be the coupling portion 125*d* (see FIG. 3) of the optical sheet 125.

Referring to FIGS. 1 to 28, a display device according to an aspect of the present disclosure includes: a display panel; a frame located behind the display panel; a substrate located between the display panel and the frame and coupled to the frame; a light source mounted to the substrate and providing light to the display panel; a fastening member passing through the substrate, coupled to the frame, and pressing the substrate toward the frame; and a pad located between the substrate and the frame, contacting with a rear surface of the substrate and a front surface of the frame, and through which the fastening member passes.

The substrate may be grounded to the frame through the pad.

The fastening member may include: a body which penetrates the substrate and the pad; and a head which protrudes outward from a front end of the body, and which is in contact with a front surface of the substrate.

A diameter of the head may be larger than an inner diameter of the pad, but smaller than an outer diameter of the pad.

The pad may have elasticity, and may be compressible between the substrate and the frame by the head.

The pad may include: a first area in contact with the head in a front-rear direction; and a second area outside the first area, wherein a thickness of the second area may be increased when a portion of the substrate corresponding to the second area is lifted toward a front of the frame.

The substrate may include a ring which defines a portion of a rear surface of the substrate, through which the body passes, and which is in contact with a front surface of the pad, wherein an inner diameter and an outer diameter of the ring may be equal to or greater than the inner diameter and the outer diameter of the pad respectively, and the ring, the pad, and the frame may have an electrical conductivity.

The light source may include a plurality of light sources spaced apart from each other, and a diameter of the head may be smaller than a distance between the plurality of light sources.

The display device may further include an insulating sheet located between the substrate and the frame, wherein the insulating sheet may include a hole at which the pad is located, and which has a diameter larger than the outer diameter of the pad, and a thickness of the pad may be equal to or larger than a thickness of the insulating sheet.

The fastening member may include: an outer fastening member adjacent to a perimeter of the substrate; and an inner fastening member located inside the perimeter of the substrate.

The inner fastening member may include: a first fastening member located in a first quadrant, in a quadrant divided by a vertical line and a horizontal line that pass through a center of the substrate; and a second fastening member located in a third quadrant.

The inner fastening member may include a plurality of inner fastening members spaced apart from each other along a vertical line or a horizontal line that pass through a center of the substrate.

The inner fastening member may be located at a center of the substrate.

The substrate may include a plurality of substrates which are next to each other, and the outer fastening member may be located at a boundary between the substrates.

The display device may further include an optical plate located between the display panel and the substrate, and spaced forward from the substrate, and a thickness of the pad may be 0.1 to 0.8 mm.

The display device may further include a reflective sheet located on a front surface of the substrate, and the fastening member may be coupled to the frame by penetrating the reflective sheet and the substrate, and may press the reflective sheet toward the frame.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings, and a configuration "B" described in another embodiment of the disclosure and the drawings may be combined with each other. Namely, although the combination between the configurations is not directly described, the combination is possible except in the case where it is described that the combination is impossible.

The above detailed description is to be construed in all aspects as illustrative and not restrictive. The scope of the present disclosure should be determined by reasonable interpretation of the appended claims, and all changes coming within the equivalency range of the present disclosure are intended to be embraced in the scope of the present disclosure.

What is claimed is:

1. A display device comprising:
a display panel;
a frame located behind the display panel;
a substrate located between the display panel and the frame, and coupled to the frame;
a light source mounted to the substrate, and providing light to the display panel;
a fastening member passing through the substrate, coupled to the frame, and pressing the substrate toward the frame; and
a pad located between the substrate and the frame, contacting with a rear surface of the substrate and a front surface of the frame, and through which the fastening member passes.

2. The display device of claim 1, wherein the substrate is grounded to the frame through the pad.

3. The display device of claim 1, wherein the fastening member comprises:
a body penetrating the substrate and the pad; and
a head protruding outward from a front end of the body, and contacting with a front surface of the substrate.

4. The display device of claim 3, wherein a diameter of the head is larger than an inner diameter of the pad, but smaller than an outer diameter of the pad.

5. The display device of claim 4, wherein the pad has elasticity, and is compressible between the substrate and the frame by the head.

6. The display device of claim 5, wherein the pad comprises:
a first area in contact with the head in a front-rear direction; and
a second area outside the first area,
wherein a thickness of the second area is increased when a portion of the substrate corresponding to the second area is lifted toward a front of the frame.

7. The display device of claim 6, wherein the substrate comprises a ring which defines a portion of a rear surface of the substrate, through which the body passes, and which is in contact with a front surface of the pad,
wherein an inner diameter and an outer diameter of the ring are equal to or greater than the inner diameter and the outer diameter of the pad respectively, and
the ring, the pad, and the frame have an electrical conductivity.

8. The display device of claim 5, further comprising an insulating sheet located between the substrate and the frame,
wherein the insulating sheet comprises a hole at which the pad is located, and which has a diameter larger than the outer diameter of the pad, and
a thickness of the pad is equal to or larger than a thickness of the insulating sheet.

9. The display device of claim 3, wherein the light source comprises a plurality of light sources spaced apart from each other,
wherein a diameter of the head is smaller than a distance between the plurality of light sources.

10. The display device of claim 1, wherein the fastening member comprises:

an outer fastening member adjacent to a perimeter of the substrate; and an inner fastening member located inside the perimeter of the substrate.

11. The display device of claim 10, wherein the inner fastening member comprises:

a first fastening member located in a first quadrant, in a quadrant divided by a vertical line and a horizontal line that pass through a center of the substrate; and a second fastening member located in a third quadrant.

12. The display device of claim 10, wherein the inner fastening member comprises a plurality of inner fastening members spaced apart from each other along a vertical line or a horizontal line that pass through a center of the substrate.

13. The display device of claim 10, wherein the inner fastening member is located at a center of the substrate.

14. The display device of claim 10, wherein the substrate comprises a plurality of substrates which are next to each other, and the outer fastening member is located at a boundary between the substrates.

15. The display device of claim 1, further comprising an optical plate located between the display panel and the substrate, and spaced forward from the substrate, wherein a thickness of the pad is 0.1 to 0.8 mm.

\* \* \* \* \*